United States Patent [19]

Setoguchi et al.

[11] Patent Number: 4,864,520

[45] Date of Patent: Sep. 5, 1989

[54] SHAPE GENERATING/CREATING SYSTEM FOR COMPUTER AIDED DESIGN, COMPUTER AIDED MANUFACTURING, COMPUTER AIDED ENGINEERING AND COMPUTER APPLIED TECHNOLOGY

[75] Inventors: Ryozo Setoguchi, 50 Minamisomeshimachi, Sendai,Miyagi; Yoshiaki Nakamura, Miyagi, both of Japan

[73] Assignee: Ryozo Setoguchi, Miyagi, Japan

[21] Appl. No.: 77,088

[22] Filed: Jul. 20, 1987

Related U.S. Application Data

[63] Continuation-in-part of Ser. No. 646,892, Aug. 30, 1984, abandoned.

[30] Foreign Application Priority Data

Sep. 30, 1983 [JP] Japan ................................ 58-182495

[51] Int. Cl.$^4$ .......................................... G06F 15/626
[52] U.S. Cl. ..................... 364/560; 364/518; 364/719; 364/522; 340/729; 340/747
[58] Field of Search ............... 364/141, 142, 188, 189, 364/518, 520, 522, 560, 719; 340/729, 734, 736, 747

[56] References Cited

U.S. PATENT DOCUMENTS

| | | | |
|---|---|---|---|
| 1,661,096 | 5/1927 | Rowe | 33/456 |
| 3,450,865 | 6/1969 | Pevas | 364/518 |
| 3,872,462 | 3/1975 | Lemelson | 340/324 A |
| 3,996,673 | 12/1976 | Vorst et al. | 35/10.2 |
| 4,246,580 | 1/1981 | Caputi, Jr. | 343/5 CM |
| 4,314,357 | 2/1982 | Uimura et al. | 364/900 |
| 4,325,065 | 4/1982 | Caputi, Jr. | 343/5 CM |
| 4,464,655 | 11/1984 | Bird | 340/715 |
| 4,507,656 | 3/1985 | Movey et al. | 340/379 |
| 4,535,328 | 11/1985 | Movey | 340/739 |
| 4,553,215 | 11/1985 | Masuda et al. | 364/525 |
| 4,608,653 | 8/1986 | Setoguchi | 364/522 |
| 4,620,287 | 10/1987 | Yam | 364/518 |

FOREIGN PATENT DOCUMENTS 0072242 4/1983 Japan ................................ 340/736

OTHER PUBLICATIONS

Freeman, Herbert; *Interactive Computer Graphics*, IEEE Catalog, No. EH0156-o 1980.
Tiller, Wayne, "Rational B-Splices for Curve and Surface Representation", *IEEE Computer Graphics and Application*, Sep. 1983, pp. 61-69.

*Primary Examiner*—Parshotam S. Lall
*Assistant Examiner*—Joseph L. Dixon
*Attorney, Agent, or Firm*—Koda and Androlia

[57] ABSTRACT

A form creating system providing a free access to a form to be created through the whole process from its first or design step to its final or manufacturing step. In this system, the position of a third point and the direction of a third straight line are first decided in accordance with the positions of first and second points as well as the directions of the first and second lines, and then such third points are connected successively to create a desired form.

5 Claims, 22 Drawing Sheets

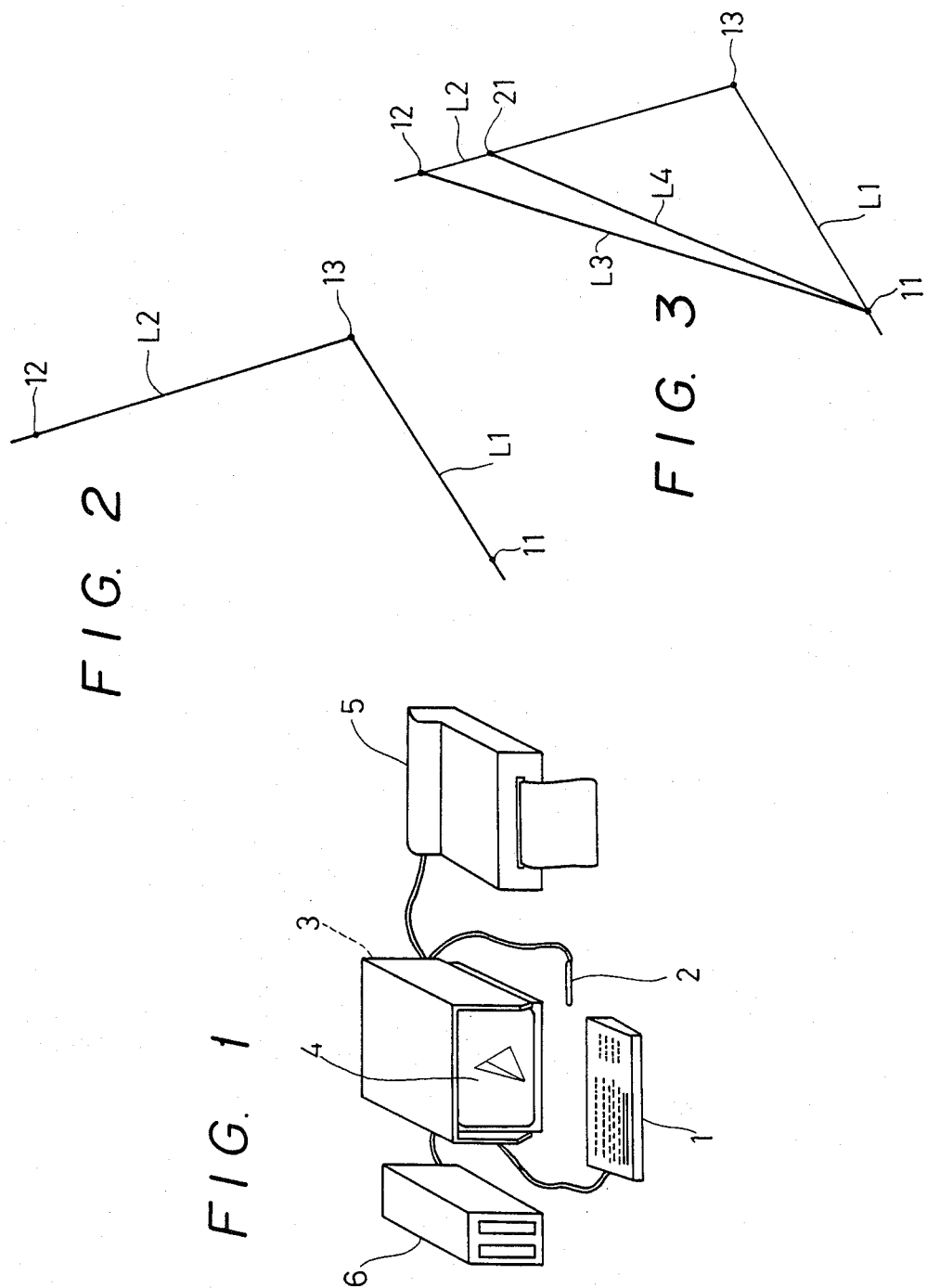

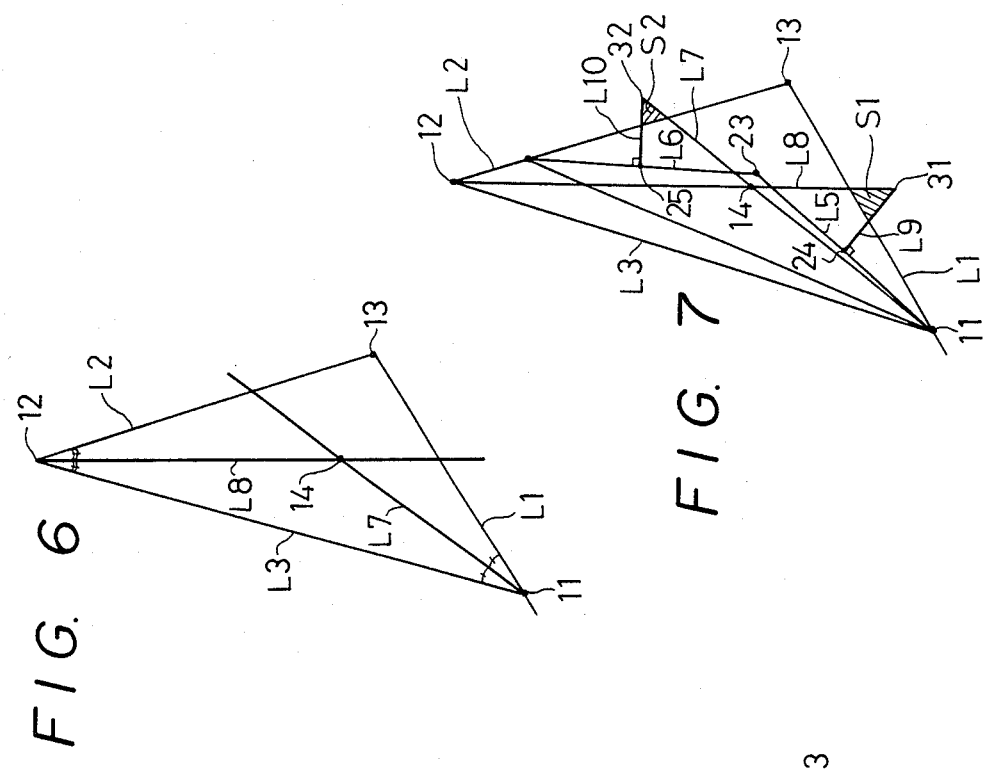
FIG. 7
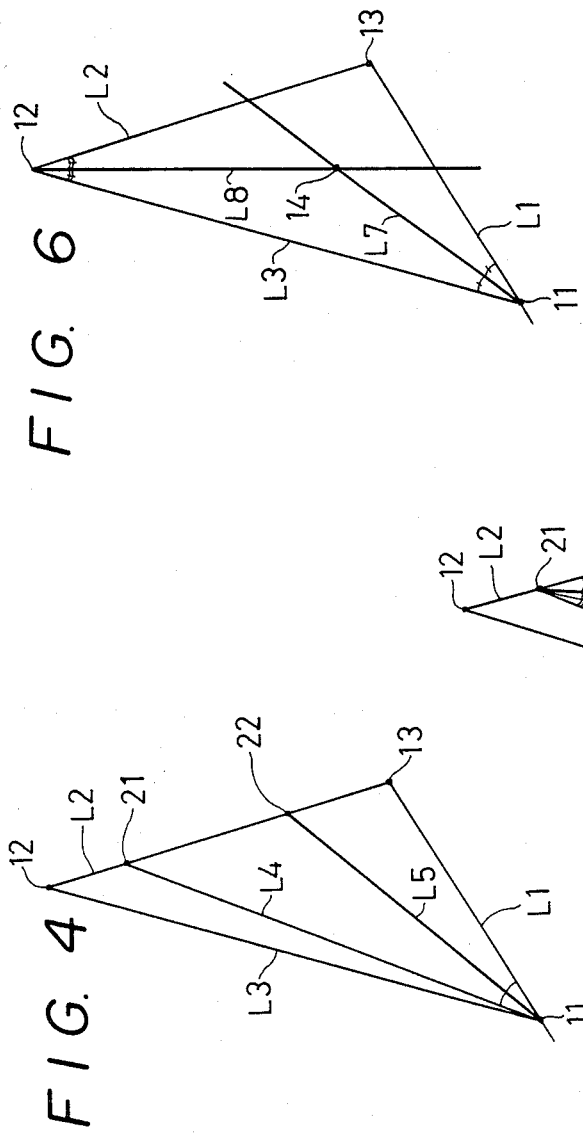
FIG. 6
FIG. 5
FIG. 4

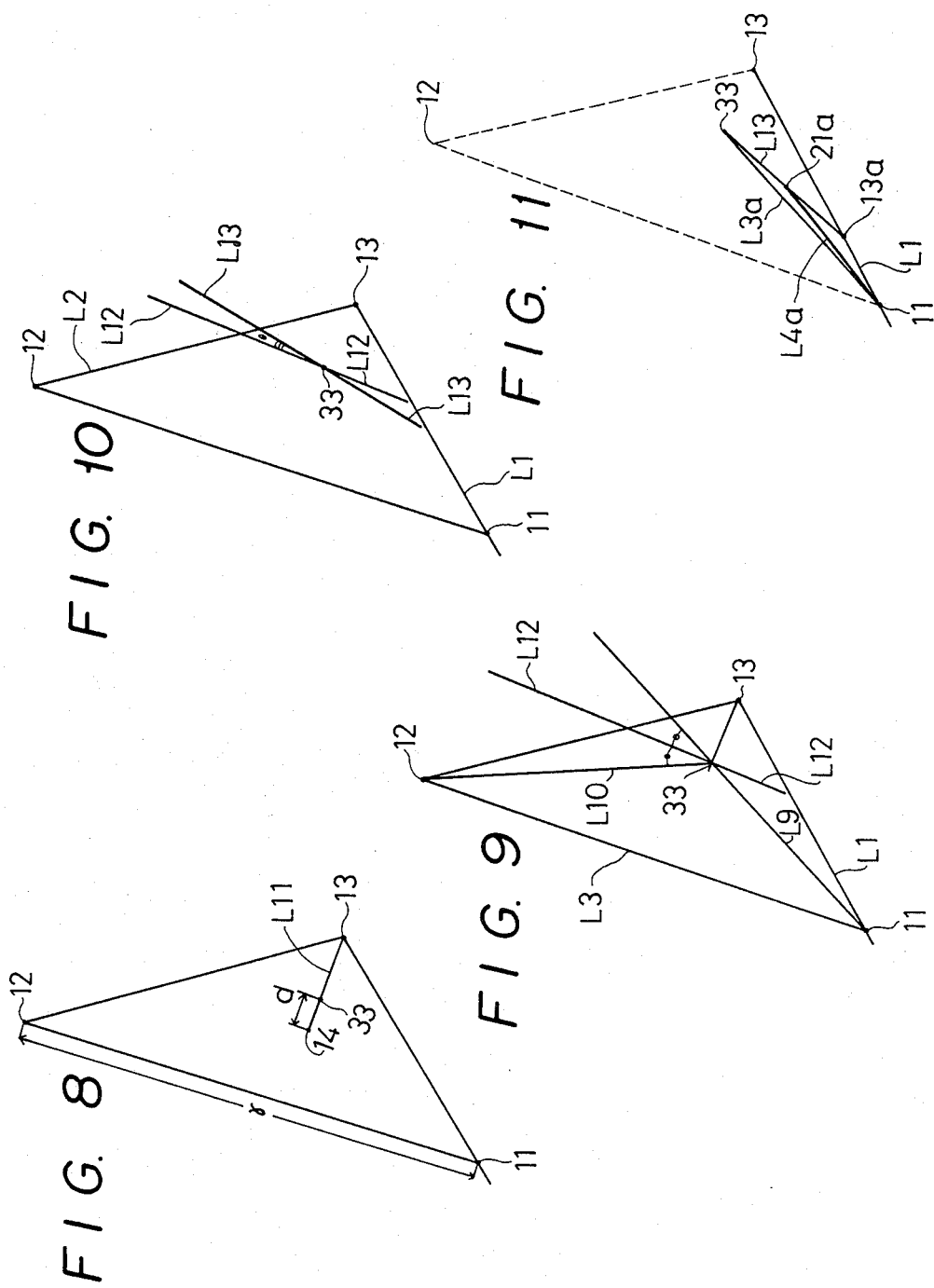

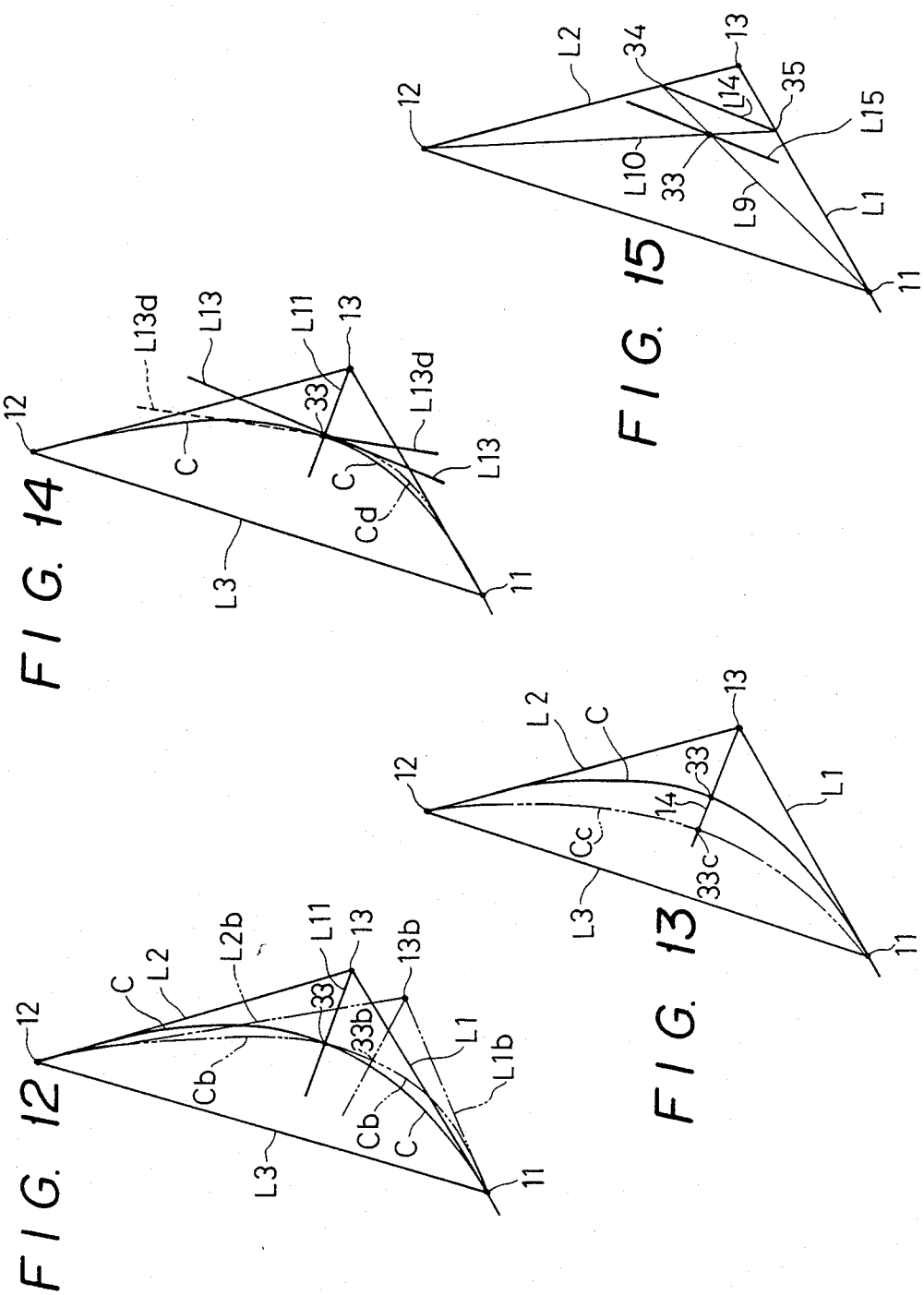

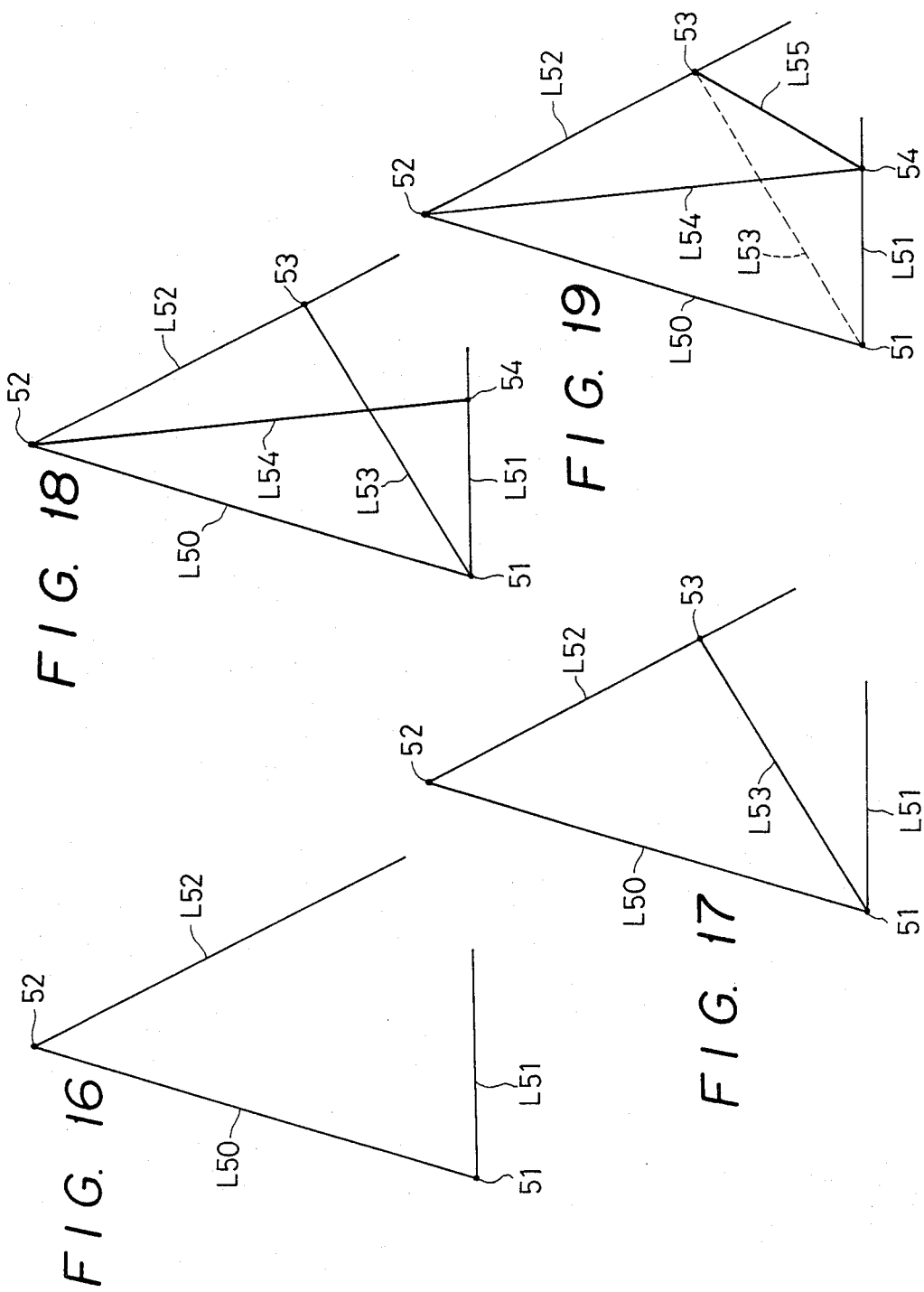

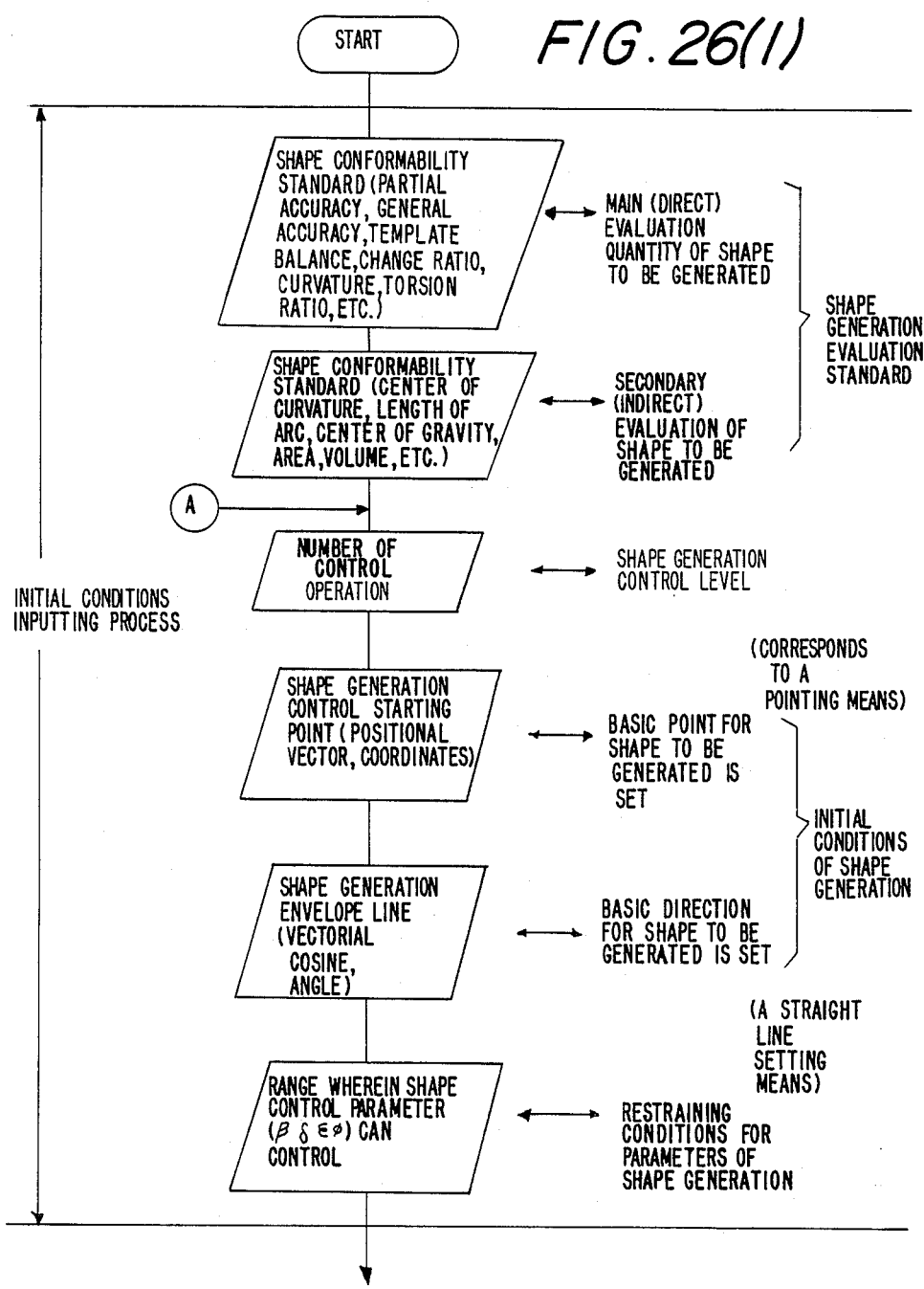

FIG. 27

```
┌─────────────────────────────────────────┐
│ SELECT EITHER ONE OF THE SHAPE GENERATING│
│ CONTROL STARTING POINTS 51 AND 52       │
└─────────────────────────────────────────┘
                    ↓
┌─────────────────────────────────────────┐
│ TURN AN ENVELOPE LINE, WHICH IS ON THE  │
│ SELECTED CONTROL STARTING POINT, ABOUT AN AXIS│
│ WHICH IS THE STRAIGHT LINE CONNECTING CONTROL│
│ STARTING POINTS (OR THE STRAIGHT LINE OR CHORD│
│ WHICH CUTS OFF THE SHAPE TO BE GENERATED FROM│
│ THE ENTIRE SHAPE), OR PROJECT THE ENVELOPE│
│ LINE ON THE PLANE WHICH IS FORMED BY THE│
│ ENVELOPE LINE ON THE NON-SELECTED CONTROL│
│ STARTING POINT AND THE CHORD            │
└─────────────────────────────────────────┘
                    ↓
┌─────────────────────────────────────────┐
│ INTERSECTION POINT FORMED BY THE STRAIGHT│
│ LINE OBTAINED BY THE PROJECTION OR      │
│ TURN AND THE ENVELOPE LINE ON THE       │
│ NON-SELECTED CONTROL STARTING POINT     │
└─────────────────────────────────────────┘
                    ↓
┌─────────────────────────────────────────┐
│ SET AN INTERSECTION POINT WITH THE OTHER│
│ ENVELOPE LINE BY PROJECTING OR TURNING IN THE│
│ SAME MANNER AS THE ABOVE AGAINST AN ENVELOPE│
│ LINE WHICH IS IN ON THE REMAINING CONTROL│
│ STARTING POINT                          │
└─────────────────────────────────────────┘
                    ↓
┌─────────────────────────────────────────┐
│ FORM A TETRAHEDRON HAVING A VERTEX WHICH IS A│
│ CONTROL STARTING POINT WHICH MAKES A PAIR OF│
│ THE OBTAINED TWO INTERSECTION POINTS 53 AND 54│
└─────────────────────────────────────────┘
```

FIG. 28

USING THE GIVEN TORSION RATIO CONTROL
PARAMETER ($\varepsilon$), EITHER SET A POINT WHICH
DIVIDES A SIDE INTO THE RATIO OF $\varepsilon : (1-\varepsilon)$,
THE SIDE BEING ONE WHICH CONTAINS THE VERTEXES
OF TWO INTERSECTING POINTS 53 AND 54 WHICH ARE
OBTAINED IN THE PREVIOUS STEP, OR SELECT ANY
ONE OF THE CONTROL STARTING POINTS, AND FOR
THE TRIANGLE FORMED BY THIS SELECTED POINT AND
THE TWO INTERSECTION POINTS 53 AND 54, SET AN
INTERSECTING POINT 55 FORMED BY THE STRAIGHT
LINE WHICH DIVIDES THE VERTEX OF THE CONTROL
STARTING POINT INTO THE RATIO OF $\varepsilon : (1-\varepsilon)$ AND
THE SIDE CONTAINING THE VERTEX FORMED BY THE
INTERSECTION POINTS

↓

SET A PLANE ($\Sigma$) CONTAINING A CONTROL STARTING
POINT WHICH MAKES A PAIR WITH THE POINT 55 ON
THE EDGE CONTAINING THE VERTEX OF THE TWO
INTERSECTION POINT OBTAINED BY THE CONTROL
PARAMETER ($\varepsilon$)

↓

PROJECT EACH OF THE PAIR OF THE ENVELOPE LINES
ONTO THE PLANE (WHICH IS DEFINED AS A
PROJECTED LINE)

FIG. 29

```
┌─────────────────────────────────────────┐
│ DETERMINE THE INTERSECTION POINT 13 OR 56│
│ OBTAINED BY THE PAIR OF ENVELOPE LINES OR THE│
│ PROJECTED LINE                          │
└─────────────────────────────────────────┘
                    ↓
┌─────────────────────────────────────────┐
│ FORM A TRIANGLE CONTAINING THREE VERTEXES│
│ WHICH ARE A PAIR OF CONTROL STARTING POINTS 11│
│ AND 12 OR 51 AND 52 AND THE INTERSECTION POINT│
│ 13 AND 56                               │
└─────────────────────────────────────────┘
                    ↓
┌─────────────────────────────────────────┐
│ CALCULATE THE LENGTH ($\gamma$) OF THE CHORD OR SIDE│
│ L3 OR L50 WHICH CONTAINS THE CONTROL STARTING│
│ POINT OF THE FUNDAMENTAL TRIANGLE AS VERTEX│
└─────────────────────────────────────────┘
                    ↓
┌─────────────────────────────────────────┐
│ CALCULATE THE AREA (A) OF THE FUNDAMENTAL│
│ TRIANGLE                                │
└─────────────────────────────────────────┘
                    ↓
┌─────────────────────────────────────────┐
│ CALCULATE THE POSITION ($J_c$) OF THE INCENTER 14│
│ OF THE FUNDAMENTAL TRIANGLE             │
└─────────────────────────────────────────┘
```

FIG. 30

COMPARE THE TWO SIDES L1 AND L2, NOT THE SIDE OR CHORD L3 OR L50 WHICH CONTAINS CONTROL STARTING POINT AS VERTEX, AND DETERMINE THE SHORTER EDGE

↓

SET THE LENGTH EQUAL TO THE SHORTER SIDE OF THE FUNDAMENTAL TRIANGLE ON THE LONGER SIDE USING THE INTERSECTION POINT OR THE VERTEX 13 OR 56 AS A STANDARD POINT, AND OBTAIN A VERTEX 21 OF THE ISOSCELES TRIANGLE WHICH IS AN ACCOMPANYING TRIANGLE

↓

FORM A ISOSCELES TRIANGLE, WHICH IS A STANDARD TRIANGLE IN THE SHAPE GENERATING PROCESS, WITH THE VERTEX 21 SET ON THE LONGER SIDE IN THE PREVIOUS STEP AND TWO VERTEXES 11 AND 13 ON THE SHORTER SIDE

↓

CALCULATE THE POSITION OF THE INCENTER OF THE ISOSCELES TRIANGLE

↓

SET A STRAIGHT LINE L5 PASSING THROUGH THE VERTEX WHICH CORRESPONDS TO THE CONTROL STARTING POINT OF THE ISOSCELES TRIANGLE AND THE INCENTER

↓

SET AN INTERSECTION POINT 22 WITH THE STRAIGHT LINE L5 PASSING THROUGH THE INCENTER AND THE SIDE L2 WHICH IS ON THE LONGER SIDE OF THE FUNDAMENTAL TRIANGLE

↓

DETERMINE THE SHAPE COEFFICIENT $\alpha$ BY THE EQUATION OF:

$$\alpha = \frac{\triangle (21)(11)(22)}{\triangle (12)(11)(22)}$$

FIG. 31

SET A MIDDLE POINT 24 ON THE BISECTOR L5 WHICH CONNECTS THE INCENTER 23 OF THE ISOSCELES TRIANGLE, WHICH IS A STANDARD TRIANGLE, AND THE CONTROL STARTING POINT 11 ON THE SHORTER SIDE WHICH IS ONE OF THE VERTEXES OF THE ISOSCELES TRIANGLE

↓

SET A PERPENDICULAR LINE L9 WHICH CROSSES THE BISECTOR L5 AT THE RIGHT ANGLE AND PASSES THROUGH THE INCENTER 24

↓

SET A MIDDLE POINT 25 ON THE LINE L6 WHICH CONNECTS THE VERTEX 21 OF THE REMAINING ISOSCELES TRIANGLE AND THE INCENTER 23, AND FURTHER SET A PERPENDICULAR LINE L10 WHICH CROSSES THE LINE L6 AT THE RIGHT ANGLE AND PASSES THROUGH THE MIDDLE POINT 25

↓

SET TWO STRAIGHT LINES L7 AND L8 WHICH PASS THROUGH THE INCENTER 14 OF THE FUNDAMENTAL TRIANGLE AND THE VERTEXES OF THE FUNDAMENTAL TRIANGLE WHICH ARE THE CONTROL STARTING POINTS

↓

CALCULATE THE AREA OF THE SMALL TRIANGLE S1 WHICH IS FORMED BY THE SHORTER SIDE L1 OF THE FUNDAMENTAL TRIANGLE, THE LINE L8, AND THE PERPENDICULAR L9, THE LINE L8 PASSING THROUGH THE VERTEX 12 FACING THE SHORTER SIDE OF THE FUNDAMENTAL TRIANGLE AND THE INCENTER OF THE FUNDAMENTAL TRIANGLE

↓

CALCULATE THE AREA OF THE SMALL TRIANGLE S2 WHICH IS FORMED BY THE LONGER SIDE L2 OF THE FUNDAMENTAL TRIANGLE, THE STRAIGHT LINE L7, AND THE PERPENDICULAR LINE L10, THE LINE L7 PASSING THROUGH THE VERTEX 11 AND THE INCENTER OF THE FUNDAMENTAL TRIANGLE, AND THE PERPENDICULAR L10

↓

DETERMINE THE AREA DIFFERENCE WHICH IS THE BASIC CONTROL QUANTITY FROM THE DIFFERENCE IN THE AREAS OF THE TWO SMALL TRIANGLES S1 AND S2, THAT IS, FROM THE EQUATION:

S (AREA OF S1)−(AREA OF S2)

FIG. 32

SET A BASIC CONDITION FOR OBTAINING THE SHAPE STRUCTURING POINT WHICH IS ON A BISECTOR L11 OF THE VERTEX 13 OF THE FUNDAMENTAL TRIANGLE. PARTICULARLY, SELECT AN INCENTER 14 AS THE BASIC COORDINATE FOR CALCULATION AND SET THE STRAIGHT LINE L11 WHICH IS POSITIVE TOWARD THE VERTEX 13 WHICH IS THE DIRECTION WHEREIN THE SHAPE STRUCTURING POINT EXISTS. THEN, SET A COORDINATE SYSTEM CONTAINING THE LINE L11 AS THE CRITERION AXIS

↓

DETERMINE THE DISTANCE BETWEEN THE POINT 33 WHEREAT THE SHAPE STRUCTURING POINT EXISTS AND THE INCENTER WHICH IS THE CRITERION POINT IN THE COORDINATE SYSTEM. IN HERE, THE DISPLACEMENT d IS ASSUMED TO BE PROPORTIONAL TO THE AREA DIFFERENCE S, AND THE POSITION CONTROL PARAMETER $\beta$ IS USED AS A CONTROL VARIABLE. THE DISPLACEMENT IS A LENGTH AND THEREFORE CAN BE DETERMINED BY THE EQUATION:

$$d = \beta \frac{\alpha \sqrt{S}}{\gamma}$$

WHEREIN $\beta$ IS THE GIVEN CONTROL PARAMETER, AND S IS THE AREA DIFFERENCE WHICH IS THE BASIC CONTROL QUANTITY

↓

THE POSITIONAL VECTOR J IS DETERMINED BY THE EQUATION $$J = J_c + du$$

WHEREIN $J_c$ IS A POSITIONAL VECTOR OF THE INCENTER AND u IS THE UNIT VECTOR ON THE BISECTOR

FIG. 33

DRAW LINE L9 AND L10 WHICH PASS THROUGH THE DEFINED SHAPE STRUCTURING POINT 33 AND THE CONTROL STARTING POINTS 11 AND 12

↓

SET A STRAIGHT LINE L12 WHICH BISECTS THE VERTICAL ANGLE AT THE VERTEX OR SHAPE STRUCTURING POINT 33. THE DIRECTION (arg ec) OF THE THIS STRAIGHT LINE L12 IS DEFINED AS AN AVERAGE DIRECTIONAL ANGLE ($\theta_m$)

↓

THE DIRECTION (arg e) OF THE SHAPE ENVELOPE LINE CAN BE DEFINED AS AN AMPLITUDE OF THE STRAIGHT LINE L12. THUS, THE AMPLITUDE ($\theta$) CAN BE DEFINED TO BE POSITIVE IN THE COUNTERCLOCKWISE DIRECTION. HERE ALSO, THE AMPLITUDE IS ASSUMED TO BE IN PROPORTION TO THE AREA DIFFERENCE, AND THE TANGENT CONTROL PARAMETER ($\delta$) IS USED. ANGLE IS NON DIMENSIONAL AND CAN BE OBTAINED BY THE FOLLOWING EQUATION:

$$\theta = \delta \frac{\alpha S}{A}$$

WHEREIN ($\delta$) IS A GIVEN CONTROL PARAMETER, AND S IS THE AREA DIFFERENCE WHICH IS THE BASIC CONTROL QUANTITY

↓

THE DIRECTION (arg e) OF THE ENVELOPE LINE CAN BE OBTAINED BY THE EQUATION:

$$\arg e = \arg ec + \theta$$

FROM THE DEFINITION OF THE TURNING ANGLE

FIG. 34

SET A NORMAL LINE OF THE CONTROL PLANE (Σ)

↓

SET AN ASSOCIATE NORMAL LINE FROM THE DEFINED NORMAL LINE AND NEWLY FORMED SHAPE ENVELOPE LINE L72 ON THE CONTROL PLANE TO FORM A COORDINATE SYSTEM WHICH CONTAINS THE SHAPE STRUCTURING POINT IN THE CONTROL PLANE AS THE ORIGIN

↓

SET A RELATIONSHIP BETWEEN THE RELATIVE COORDINATE SYSTEM AND ABSOLUTE COORDINATE SYSTEM

↓

A GIVEN TORSION RATIO CONTROL PARAMETER (ø) IS A POSITIVELY PROJECTED QUANTITY IN THE RELATIVE COORDINATE AND THEREFORE IS OBTAINED, FROM THE GEOMETRICAL RELATIONSHIP, AS A DIRECTION IN THE RELATIVE COORDINATE SYSTEM

↓

SET A SPATIAL DIRECTION OF THE SHAPE GENERATING ENVELOPE LINE FROM THE RELATIONSHIP OF THE RELATIVE COORDINATE AGAINST THE ABSOLUTE COORDINATE SYSTEM

SHAPE GENERATING/CREATING SYSTEM FOR COMPUTER AIDED DESIGN, COMPUTER AIDED MANUFACTURING, COMPUTER AIDED ENGINEERING AND COMPUTER APPLIED TECHNOLOGY

This is a continuation-in-part application of Ser. No. 646,892, filed Aug. 30, 1984 now abandoned.

BACKGROUND OF THE INVENTION

1. Field of the Invention

The present invention relates to a system for creating and modifying a boundary shape of the required/presented solid in the field of CAD (Computer Aided Design) and/or CAM (Computer Aided Manufacturing), NC machine tool, computer graphics, computer vision and the like.

2. Description of the Prior Art

In CAD/CAM, computer vision or the like, conventionally there are well known three types of modellings to express a desired or predetermined form. Those are a wire frame modeller, a surface modeller, and a solid modeller.

Briefly, as for the wire frame modeller, the above kinds of forms can be expressed by using constructed points which are roughly populated as a finite type of a set which has lower density.

As for the surface modeller, these forms can be also expressed by the same type of a set which has higher density.

In these cases, the two modellers of the above type can be performed by the way estimating the lacked points among the given points obtained so as to express the form, that is by means of interpolation operation based on the functional approximation. The solid modeller piles up simple or primitive forms obtained as the typical sets in which the points are densely populated in a manner similar to a building-blocks work to express a predetermined form. Each of these three conventional methods features a function to express forms for solid bodies.

However, when used to express a three-dimensional form, the above-mentioned prior art method lack is flexibility of expression; therefore, they are unable to perform their functions sufficiently. Also, it is well known that a form expression is one embodiment of a form producing/finishing process while a form creation is also another one embodiment of the same process. All of the conventional modellings, however, are incapable of performing a continuous and throughout processing operation between these two embodiments.

For example, even when the prior art of solid modeller is used, some of three-dimensional forms can be indeed expressed by means of combination of simple forms, but the solid model method inherently can not provide a free and detailed expression of such three-dimensional form. Thus, it can be naturally said that it is almost impossible to carry out a continuous and throughout processing operation from the form expression step to the form creation step.

SUMMARY OF THE INVENTION

Accordingly, it is a principal object of the present invention to provide an improved, unique boundary shape generating/creating system which is freely accessible through-out its whole process ranging from design of a model or the like to manufacture of an actual form, eliminating the drawbacks in the prior art methods.

In accomplishing this object, according to the invention, at first, a first point, a first straight line passing through the first point, a second point, and a second straight line passing through the second point are set in an arbitrary way. Next, the positions of the first and second points as well as the directions of the first and second straight lines are used to determine the position of a third point to be found as well as the direction of a third straight line passing through this third point.

Thereafter, based upon the arbitrarily setting of the first and second points and lines as well as the newly determined third point and line, another new third point and line are obtained. Similar operations are successively performed to provide a large number of points (successively determined third points) between the first and second points, and then these points are connected successively to create a boundary shape of the required/presented solid. If such a boundary shape generating/creating process is displayed on a display unit, it is naturally understood that such a boundary shape generating/creating process itself is a CAD (Computer Aided Design) and also that data on the boundary shape generated/created, as they are, can be used to operate an NC machine tool. It should be noted that the term "create" is used to mean "create and/or generate" in this specification.

The above and other related objects and features of the invention will be more apparent from the following description of the disclosure, accompanying drawings, and the novelty thereof will be pointed out in the appended claims.

BRIEF DESCRIPTION OF THE DRAWINGS

FIG. 1 is a general view of an embodiment of the invention;

FIG. 2 is a graphical representation illustrating the first setting step required to create a form;

FIG. 3 is a graphical representation of fundamental and isosceles triangles both formed from the setting in FIG. 2;

FIG. 4 is a graphical representation illustrating how to determine a constant $\alpha$ necessary to find a third point constituting a part of a form to be created;

FIG. 5 is a graphical representation illustrating how an incenter of the isosceles triangle is found;

FIG. 6 is a graphical representation illustrating how an incenter of the fundamental triangle is found;

FIG. 7 is a graphical representation illustrating the way to determine an unequilibrium amount S;

FIG. 8 is a graphical representation illustrating how to find a distance d from the incenter of the fundamental triangle to a third point to be found;

FIGS. 9 and 10 are graphical representations illustrating how a third line at a third point is found;

FIG. 11 is a graphical representation illustrating how to find a new third point;

FIG. 12 is a graphical representation illustrating how a form can be changed when only the directions of the first and second lines among parameters are varied;

FIG. 13 is a graphical representation illustrating how a form can be changed when only a position control parameter $\beta$ is varied;

FIG. 14 is a graphical representation illustrating how a form can be changed when only a tangent control parameter $\delta$ is varied;

FIG. 15 is a graphical representation illustrating a principle to find a third straight line in a simplified manner;

FIG. 16 is a graphical representation illustrating a state in which the first and second points as well as the first and second lines are set to create a three-dimensional form;

FIG. 17 is a graphical representation illustrating a state in which the first straight line is orthogonally projected on a surface formed by a chord and the second straight line;

FIG. 18 is a graphical representation illustrating a state in which the second straight line is orthogonally projected on a surface formed by the chord and the first straight line;

FIG. 19 is a graphical representation illustrating how to form a fundamental triangular pyramid;

FIGS. 27, 28, 29, 30, 31, 32, 33, 34 and 35 show, as subroutines, the details of each basic procedure of the flow chart of FIGS. 26(1) through 26(5).

DETAILED DESCRIPTION OF THE INVENTION

Figure 22:
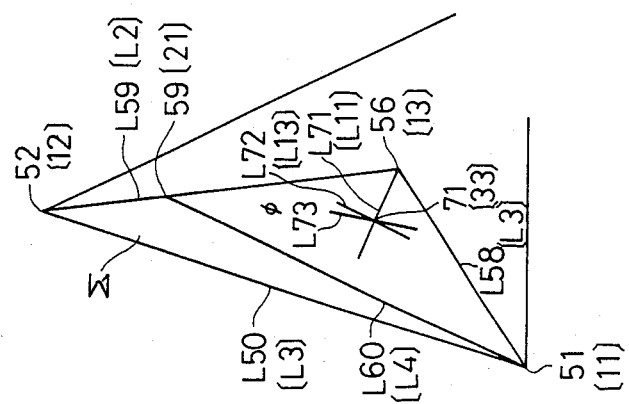
FIG. 22 is a graphical representation illustrating how to find a third point in creating a three-dimensional form.

We will now describe the present invention in detail with reference to the embodiments shown in the appended drawings.

In FIG. 1, a general view of a system, a first embodiment, of the invention is illustrated.

The illustrated embodiment is provided with a keyboard 1 and a ligh pen 2 which cooperate to input positional information on a point that corresponds to the end of a boundary shape to be generating/created that is, the first point of the boundary shape to be generating/created. It also incorporates an operation circuit 3 to perform a predetermined operation in accordance with input signals from input means such as keyboard 1 and light pen 2. The system further includes a display unit to display the thus-created boundary shapes, a printer 5 to print out such boundary shapes, and an external memory unit 6 which stores the created boundary shapes in the form of predetermined signals such as magnetic signals or light signals.

FIGS. 2 through 22 illustrate principles of the invention that are useful in generating/creating a boundary shape of the required/presented solid. In particular, FIGS. 2 through 11 show the principles of the invention that can be used to obtain two-dimensional boundary shapes. In FIGS. 2 through 22, the solid lines are used to express lines that are newly found in the respective figures.

Specifically, in FIG. 2, there is shown the first setting step necessary to generate/create a boundary shape. A first point 11 and a second point 12 are both set at their arbitrary but different positions, respectively. A first straight line L1 passes through the first point 11 and a second straight line L2 passes through the second point 12. All of these points and lines are present on the same plane, so that a desired form can be produced between these two points.

To set these points and lines, light pen 2, for example, may be placed at an arbitrary position on the display unit 4 to set the first point 11. Similarly, the second point 12 can be established at an arbitrary position which is different from the first point 11. Then, a straight line passing through the first point 11, or L1, is set, with its direction determined by the keyboard 1. Likewise, a straight line passing through the second point 12, or L2, is set, with its direction determined by keyboard 1. A point where both lines L1 and L2 intersect with each other is set as an intersection point 13.

Although in the above description the information on the positions of the points as well as on the directions of the straight lines is inputted by means of keyboard 1 and light pen 2, it should be understood that this is not limitative but other suitable input means such as digitizers may also be used for this purpose.

FIG. 3 illustrates a fundamental triangle and an isosceles triangle both formed from the setting shown in FIG. 2.

First and second points 11 and 12 are connected to draw a line segment, which is denoted by L3 and called a chord. The reason why this line L3 is called a chord is that when a part (a contour line) of a desired form is to be generated/created between the first and second points 11 and 12, if such a contour line is considered as a circular arc, then the line L3 corresponds to a chord thereof. A triangle enclosed by three lines L1, L2 and L3 is here called a fundamental triangle. In this case, the shorter side of the two sides other than the side formed by chord L3, among the three sides of this fundamental triangle, is one formed by line L1. This shorter side is a line segment connecting points 11 and 13. Then, an isosceles triangle having two equilateral sides, each being equal to the above-mentioned shorter side, is formed so as to be superposed on the fundamental triangle. In other words, a new point which is equi-distant from the intersection point 13 as with line L1 is set on line L2. This new point is represented by 21. Thus, the other of the equilateral sides of this isosceles triangle is a line segment connecting point 21 and intersection point 13 in FIG. 2. A line segment between first point 11 and new point 21 is called L4.

FIG. 4 illustrates how to determine a constant α necessary to find a third point constituting a part of a boundary shape to be generated/created.

Specifically, a straight line bisecting an internal angle of an isosceles triangle at point 11 is denoted as L5, and such an internal angle is denoted as $<(13)(11)(21)$. Here $<(13)(11)(21)$ expresses an angle included by a line segment between points 13 and 11, and a line segment between points 11 and 21. This way of expression on angles will be employed hereinafter as well.

The constant α is found: $\alpha = $ (area of $\Delta(21)(11)(22)$) / (area of $\Delta(12)(11)(22)$) wherein $\Delta(21)(11)(22)$ denotes a triangle enclosed by points 21, 11 and 22. Also, this way of expression on triangles will be employed hereinafter as well.

FIG. 5 illustrates how to find an incenter of the above-mentioned isosceles triangle.

Generally, an incenter of a triangle is a point of bisectors of its respective internal angles and the three bisectors intersect at one point. A bisector of the internal angle of the isosceles triangle at point 21 is denoted by L6. A point of intersection of the two bisectors L5 and L6, or, the incenter of the isosceles triangle is represented by the numeral 23. A middle point between the point 11 and incenter 23 is denoted as 24 and a middle point between point 21 and incenter 23 is denoted as 25.

FIG. 6 illustrates how to find an incenter of the above-mentioned fundamental triangle.

In this figure, a bisector of the internal angle of the fundamental triangle at point 11 is represented by a straight line L7, a bisector of the same at point 12 by a straight line L8, and an intersection point of the two bisectors L7 and L8 or the incenter of the fundamental triangle is represented by point 14.

FIG. 7 illustrates how to decide an unequilibrium amount S. Not only the parameter $\alpha$ is but also a parameter $\beta$ is necessary to find a third point constituting a part of the form to be created. To obtained parameter $\beta$, it is necessary to decide the unequilibrium amount S, which depends on the difference between the attributes of the fundamental and the isosceles triangles.

To set up the unequilibrium amount S, FIGS. 4 and 5 are first superposed on each other. Then, bisectors L7 and L8 are respectively extended. A perpendicular L9 is drawn at point 24, and a perpendicular L10 is drawn at point 25. Let a triangle enclosed by perpendicular L9, bisector L8 and line L1 be S1 and a triangle enclosed by perpendicular L10, bisector L7 and line L2 be S2. Then the unequilibrium amount S is found as follows:

$$S = (\text{area of } S1) - (\text{area of } S2)$$

Alternatively, other suitable techniques than the above may be used to obtain such amount S.

FIG. 8 illustrates how to obtain a distance d between the internal center 14 of the fundamental triangle and a third point to be found now.

Let a straight line connecting incenter 14 and intersection 13 be L11. This line L11 is a bisector of the internal angle of the fundamental triangle at point 13. Let a third point to be found now be point 33, and suppose that this third point 33 is present on line L11. Conversely speaking, when assuming that there exists a point at which L11 and a form to be created intersect with each other, this intersection point can be called a third point 33 to find the third point 33. Let the distance between point 33 and incenter 14 be d.

The distance d can be found as follows:

$$d = \beta(\alpha.S)/\gamma$$

where the parameter $\beta$ denotes a position control parameter and the parameter $\gamma$ stands for the length from the first point 11 to the second point 12.

FIGS. 9 and 10 illustrate how to find a third straight line L13 at the third point 33.

Here, line L13 is a tangent to a form outline at point 33. In other words, when an outline of a desired form is drawn between points 11 and 12, a tangent to the outline at point 33 is the third straight line L13. Conversely speaking, line L13 is a straight line required to produce a new third point between points 33 and 11. This third straight line is found as follows:

Let a straight line passing through both points 11 and 33 be L9, a straight line passing through both points 12 and 33 be L10, and a bisector of the intersectional angle of lines L10 and L9 be L12. This bisector L12 is shown in FIG. 9. Let a straight line intersecting with bisector L12 at angle $\theta$ and also passing through the point 33 within the plane of the fundamental triangle be L13. The angle $\theta$ can be found as follows:

$$\theta = \delta.(\alpha.S)/A$$

where the parameter $\delta$ expresses a tangent control parameter, and A stands for the area of the fundamental triangle. The thus-obtained straight line is the third straight line L13. If the operation described in FIGS. 2 through 8 is executed using this third straight line L13, then the position of a new third point can be found.

FIG. 11 illustrates how to find a new third point in the above-mentioned manner.

Specifically, considering the point 33 as an alternative of point 12 in FIG. 1 and line L13 as an alternative of line L2, the operations described in FIGS. 2 through 8 are executed repeatedly. Point 21a corresponds to point 21 shown in FIG. 3, and point 13a corresponds to point 13 in FIG. 2. Therefore, $\Delta(11)(33)(13a)$ is a new fundamental triangle and $\Delta(11)(21a)(13a)$ is a new isosceles triangle.

Then, if the same operations as illustrated in FIGS. 9 and 10 are carried out, then a new third straight line can be obtained. Also, similar operations are performed between point 12 and point 33 to find another new third point and straight line.

In this way, a great number of points can be found between point 11 and 12. If these points are connected successively, then a boundary shape of the required/presented solid (or, an outline for such a boundary shape is created between points 11 and 12. For higher accuracy, in this case, the number of repetition of the operations described in connection with FIGS. 2 through 11 may be increased.

When it is desired to modify the boundary shape once generated/created in accordance with the above-described principles, its parameters may be varied, including the position of the first point 11, the position of the second point 12, the direction of the first straight line L1, the direction of the second straight line L2 and constants $\beta$, $\delta$.

Examples modified by varying some of the parameters are shown in FIGS. 12 through 14.

FIG. 12 illustrates how the boundary shape can be modified when only the directions of lines L1 and L2 out of all the parameters are changed.

In this figure, boundary shape C has been generated/created created by considering the first and second straight lines as L1 and L2 respectively in accordance with the way described above. (Of course, this form C may be considered as an outline of a boundary shape of the required/presented solid, not as the desired form itself.) Here, with the first and second points 11 and 12, position control parameter $\beta$, and tangent control parameter $\delta$ unchanged, if the first and second lines are changed to L1b to L2b respectively, then the boundary shape C is altered into a form representing by a two-dot chained line Cb. As shown, the feature of the boundary shape modified through the changes of the directions of the first and second lines L1 and L2 is that its convex portions are respectively shifted upwardly and downwardly with respect to the bisector L11.

In other words, when Line L1 is rotated clockwise (in this case, line L2 is rotated counter-clockwise), the convex portions of the boundary shape Cb are displaced downwardly of bisector L11, as can be seen from comparison with the form C. On the contrary, when line L1 is rotated counter-clockwise (in this case, line L2 is rotated clockwise), the convex portions of the modified boundary shape are shifted upwardly of bisector L11.

It is noted here that both lines L1 and L2 must not be parallel to each other after they are respectively rotated. This is necessary to ensure that the boundary shape generated/created has no inflection point at point 11 or 12. Therefore, when the boundary shape generated/created may have an inflection point at either of point 11 and 12, no special restrictions are required on the rotational conditions between lines L1 and L2.

FIG. 13 illustrates how a boundary shape can be modified when only the position control parameter $\beta$ is changed.

Change of the position control parameter $\beta$ causes the degree of expansion of the entire boundary shape or the curvature of the boundary shape to vary. In FIG. 13, there is shown changes of the boundary shape which occurs when the position control parameter $\beta$ is changed to a negative value after it is set as a positive value and the boundary shape C is once created. Form Cc, which is obtained after parameter $\beta$ is changed to a negative value, has a smaller degree of expansion than that of the boundary shape C and comes nearer the chord L3.

In other words, if the position control parameter $\beta$ is set as 0, then the boundary shape passes through the incenter 14 of the fundamental triangle. If the parameter $\beta$ is set as a positive value, then the boundary shape expands out away from the internal center 14 to come closer to the intersection point 13; the greater parameter $\beta$, the closer the boundary shape comes to intersection point 13. Conversely, if the parameter is changed to a negative value, then the boundary shape contracts away from internal center 14 and approaches the chord L3; the greater the absolute value of the parameter, the closer it approaches chord L3, which means that the boundary shape C comes closer to a straight line. The term "position" in "position control parameter" means a position at which the boundary shape to be generated/created intersects with bisector L11. Thus, to change the position control parameter $\beta$ means the change of this intersection points. Accordingly, in other portions of the generated/created boundary shape than the intersection point, the boundary shape is altered only in curvature. Also, when the boundary shape generated/created prior to the change of the position control parameter $\beta$ is contained within the fundamental triangle, even if the parameter is thereafter changed, the boundary shape generated/created will not be bulged out of the fundamental triangle.

FIG. 14 illustrates how a boundary shape can be changed when only the tangent control parameter $\delta$ is varied.

When the tangent control parameter $\delta$ is varied, the degree of the expansion of the boundary shape can be changed between two points used to a boundary shape (or to modify a boundary shape generated/created that is, two points corresponding to the then first and second points.)

In other words, the boundary shape C is once assumed to be generated/created between the first and second points 11 and 12. In this case, the third straight line L13 is identical with a tangent to the boundary shape C at the third point 33. After such point 33 and line L13 is determined, a new third point is decided between points 11 and 33 in accordance with the directions of this tangent L13 and line L1. In this way, the boundary shape is gradually determined or produced.

By the way, to change the tangent control parameter $\delta$ means to change the direction of the above-mentioned tangent (or, the third line L13). Therefore, the change of the tangent control parameter is identical with the change of the direction of the second line L2 when originally generating/creating a boundary shape, and thus this can be considered to be the same case as described in connection with FIG. 12. In this case, however, there is discontinuity at a point (the third point 33) in the boundary shape because line L1 is not changed.

Specifically, if the tangent control parameter $\delta$ is changed at point 33 to change line L13 into L13d, for example, then a boundary shape generated/created is changed into one shown by a two-dot chained line Cd between points 33 and 11. That is, if line L13 is rotated clockwise by changing the tangent control parameter $\delta$, then a boundary shape generated/created is expanded out to the right in the drawing within the lower portion of the bisector L11. The tangent control parameter is useful to enhance the degree of freedom of the operation of generating/creating a boundary shape.

Also, it should be noted that the values of the above-mentioned position and tangent control parameters can be varied to generate/create a form or modify a generated/created boundary shape not only between points 33 and 11 or 33 and 12, but also between every point and any other point in the boundary shape C. Thus, it is possible to modify the entire boundary shape C as well as any-desired portion of the boundary shape C in an easy and desired manner.

FIG. 15 illustrates a principal to find a third straight line in a simple manner.

Let an intersection point of an extension of line L9 and line L2 be point 34, let an intersection point of an extension of line L10 and line L1 be point 35. These points 34 and 35 are connected to draw a line L14, and let a line, drawn by parallely displacing the line L14 onto point 33, be L15. This new line L15 is used in place of line L13. When $\theta$ is ambiguous in terms of accuracy, it is convenient to employ line L15 as a third straight line.

The above-mentioned manner is usually used to generate/create or modify a planar boundary shape. This manner, however, can also be applied in generating/creating or modifying a three-dimensional boundary shape. Specifically, the above manner is used to create a plurality of planar boundary shapes and then these planar boundary shapes are superposed on each other to produce a three-dimensional boundary shape in the boundary shape of the so-called flexible wire frame or network.

Although the above description relates to a creation of a boundary shape, it may also be applied in drawing a previously existing boundary shape. Namely, at first a boundary shape similar to the existing boundary shape is once produced roughly, and then its position control parameter or tangent control parameter is varied to adjust the shape of the roughly-produced boundary shape. As the case may be, the points 11 and 12 as well as the directions of the lines L1 and L2 may be varied.

Next, a principle to generate/create a three-dimensional boundary shape will be described below.

In this case, a three-dimensional boundary shape is not directly generated/created. Bit a plurality of outlines or three-dimensional outlines of the boundary shape are first obtained and then these outlines are connected successively to create a boundary shape of the required/presented solid.

In FIG. 16, a first point 51, a second point 52, a first straight line L51, and a second straight line L52 are given positions. Here, L51 is a line that passes through the point 51, while L52 is a line that passes through the point 52. Points 51 and 52 are interconnected to produce a chord 50. The reason why this line segment connecting these two points is called a chord is the same as described in connection with FIG. 3.

Here, the extensions of the lines L51 and L52 are considered not to intersect with each other. That is, a boundary shape to be generated/created here is a three-dimensional boundary shape and thus outlines to be drawn between points 51 and 52, in many cases, do not exist on one plane. Also, the line L51 should be a tangent to the outline at point 51, and line L52 should be a tangent to the outline at point 52. For this reason, in most cases, lines L51 and L52 do not intersect with each other.

FIG. 17 illustrates an orthographic view of the first line L51 projected on a plane composed of the chord 50 and the second line L52. Let the orthographically-projected line of line L51 be L53. That is, when light is applied to the plane formed by chord 50 and line L52, the resultant shadow of line L51 is considered as line L53.

FIG. 18 illustrates an orthographic view of the second line L52 projected on a plane formed by the chord 50 and the first line L51. Let the orthographic line of the line L52 be L54. That is, when light is applied to the plane formed by chord 50 and line L51, the resultant shadow of the second line L52 is considered as line L54.

FIG. 19 illustrates how to boundary shape a fundamental triangular pyramid. Specifically, the points 53 and 54 are connected to produce a line segment. Let this line segment be L55. As a result, four planes enclosed by lines L50, L51, L52, L53, L54 and L55 are produced, which in turn cooperate to enclose or form a triangular pyramid. This in interpreted as a fundamental triangular pyramid.

Figure 20:
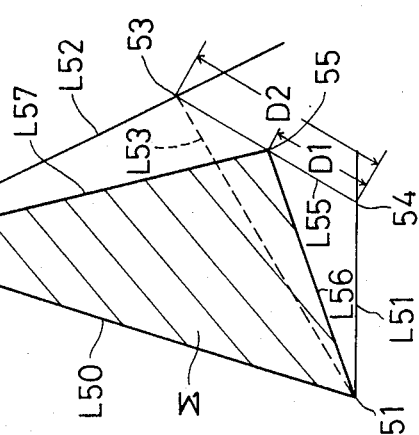
FIG. 20 is a graphical representation illustrating how to form a temporary triangle.

FIG. 20 illustrates how a temporary triangle Σ is formed. A torsion control parameter is used to find a point 55 on line segment L55. This torsion control parameter ε can be obtained from the following equation:

$$\epsilon = D1/D2$$

where, D1 is the distance between points 54 and 55 and D2 is the distance between points 54 and 53. These distances D1 and D2 are determined depending on cases. If the ratio of D1 to D2, namely, the torsion control parameter ε is varied, then a boundary shape to be generated/created is changed.

Alternatively, the tension control parameter ε may be obtained as a ratio of angles.

Then, let a line segment between the thus-obtained point 55 and the first point 51 be L56, and a line segment between points 55 and 52 be L57. These line segments L50, L56 and L57 cooperate to enclose a triangle. This triangle is called a temporary triangle Σ.

Figure 21:
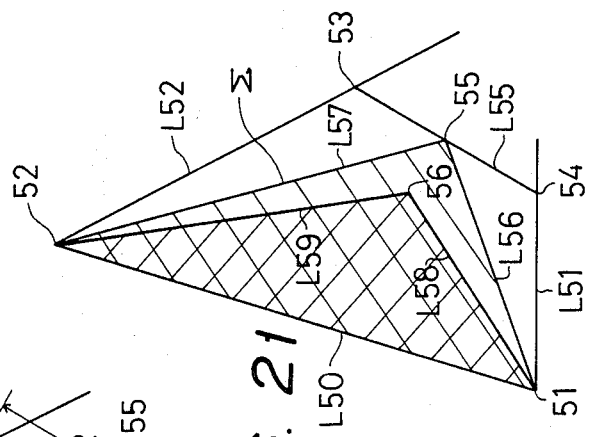
FIG. 21 is a graphical representation illustrating how to form a fundamental triangle in the temporary triangle.

FIG. 21 illustrates how to boundary shape a fundamental triangle within the above-mentioned temporary triangle Σ.

Let an orthograph of line L51 that is projected into the temporary triangle Σ be a straight line L58, and an orthograph of line L52 into the same temporary triangle be a straight line L59. Also, let an intersection point between these lines L58 and L59 be point 56.

A triangle that is enclosed by line L50 and the thus obtained lines L58 and L59 is a three-dimensional, fundamental triangle necessary for generation/creation of a three-dimensional boundary shape. This three-dimensional fundamental triangle corresponds to the fundamental triangle formed in FIG. 3 to generate/create the two-dimensional boundary shape.

FIG. 22 illustrates how to boundary shape an isosceles triangle from the above-mentioned three-dimensional fundamental triangle.

Specifically, the above-mentioned fundamental triangle can be operated similarly to the triangle in FIG. 3. Thus, when a boundary shape generated/created at the then time, the same idea as employed in the previously described two-dimensional boundary shape generation/creation can be applied. That is, if the same operations as in FIGS. 2 through 10 are performed based on the three-dimensional fundamental triangle $\Delta(52)(51)(56)$ and isosceles triangle $\Delta(59)(51)(56)$, then three-dimensional third point 71 and third straight line L73 can be found.

However, a torsion control auxiliary parameter $\phi$ must be used to create a three-dimensional boundary shape. Specifically, a tangent to an outline of a boundary shape to be generated/created at point 71 has, at a certain angle, a relative line L73 within the plane of the three-dimensional fundamental triangle. This certain angle is called a torsion control auxiliary parameter $\phi$. This parameter must be taken into consideration to obtain a three-dimensional form. Line L72 is a straight (tangent) line that is obtained as a result of consideration of the torsion auxiliary parameter $\phi$.

In FIG. 22, references given with [] respectively correspond to the points or straight lines shown in FIGS. 2 through 11.

Accordingly, if the operations shown in FIGS. 16 to 22 are performed based on line L51 or L52 and the line obtained as a result of consideration of torsion control auxiliary parameter $\phi$, then a new third point and straight line is obtained. These operations can be executed repeatedly to obtain a three-dimensional outline. The thus-obtained outlines can be connected one by one successively to provided a three-dimensional boundary shape.

For example, let the coordinates of point 51 be (2.0, 0.0, 0.0), direction cosign of line L51 be (0.0, 0.7232, 0.6906), coordinates of point 52 be (0.0, 2.0 π), direction cosign of line L52 be (−0.7232, 0.0, 0.6906), position control parameter β be 0, tangent control parameter δ be 0, torsion parameter be 0.5, and torsion control auxiliary parameter $\phi$ be −0.0467. Then, a boundary shape that is generated/created by these factors provides an isoclinal boundary shape.

Figure 23:
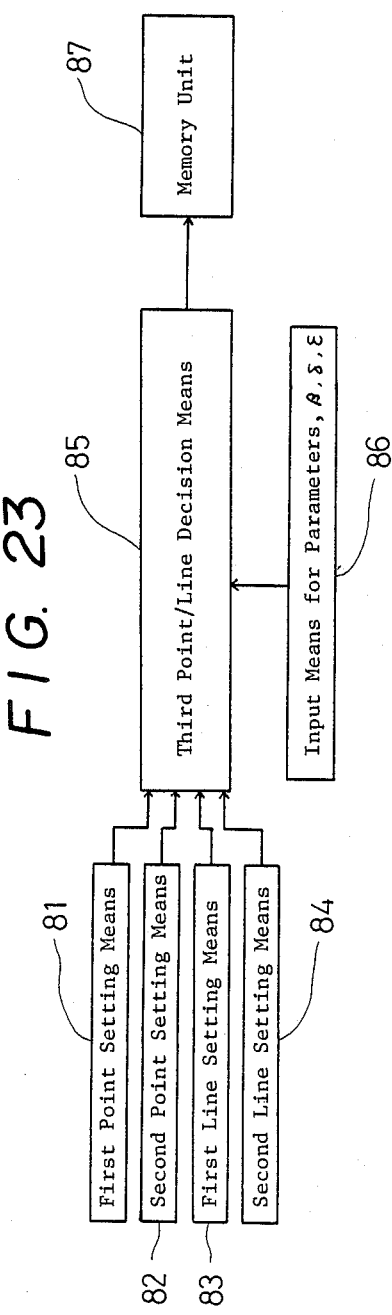
FIG. 23 is a block diagram of an embodiment of the present invention.

FIG. 23 shows a block diagram of an embodiment of the invention.

This embodiment includes a first point setting means 81 to set up a first point 11 at an arbitrary position as shown in FIG. 2, and a second point setting means 82 to set up a second point 12 at an arbitrary position different from that of point 11. In this embodiment, there are also provided a first straight line setting means 83 to set up a first line L1 passing through point 11 in an arbitrary direction and a second straight line setting means 84 to set up a second line L2 passing through point 12 in an arbitrary direction. Examples of these setting means 81—84 include input means such as keyboard 1 and light pen 2. As its principle is shown in FIGS. 2 through 10, there is provided a third point/straight line decision means 85 which, in accordance with the positions of points 11 and 12 as well as the directions of lines L1 and L2, decides the position of a third point 33 and the direction of a third straight line L13 containing this third point 33. An operation circuit 3 serves as the third point/straight line decision means 85.

In obtaining a two-dimensional boundary shape, the same principles as explained in FIGS. 2 to 10 may be applied, while in order to set up a three-dimensional boundary shape (or its outline), the principles discussed in connection with FIGS. 17 to 22 must be employed. The operation circuit 3 is adapted to be able to realize all of these principles. Alternatively, a computer may be used instead of the operation circuit 3.

Third point/straight line decision means 85 is also provided with input means 86 for inputting the parameters $\beta$, $\delta$, $\epsilon$, $\phi$, and the like. Keyboard 1 may be used as this input means 86. There is further provided a memory unit 87 which stores information on each point decided by the decision means 85.

As described above, the embodiment in FIG. 23 is constructed such that, as a first step, it can find a third point from the first and second points 11 and 12 as well as the first and second lines L1 and L2.

Figure 24:
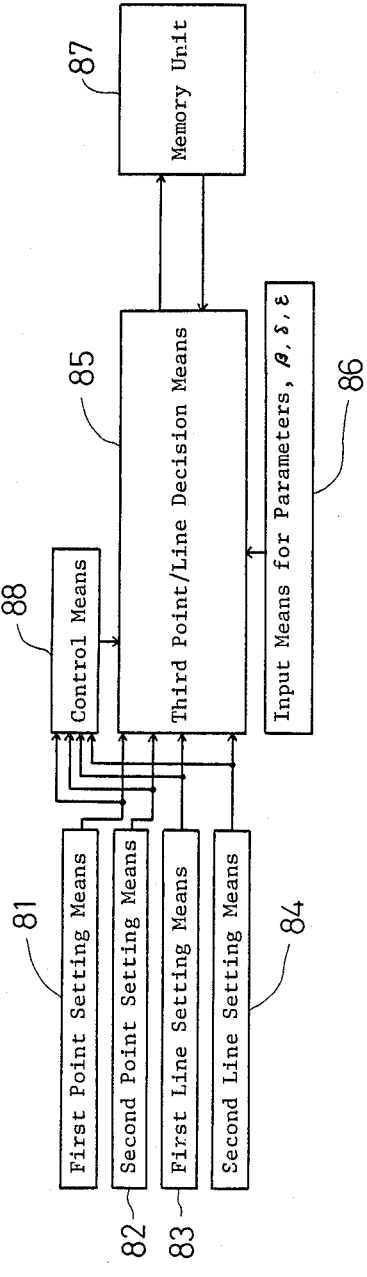
FIG. 24 is a block diagram of another embodiment of the present invention.

FIG. 24 illustrates a block diagram of another embodiment of the invention. This embodiment is provided with a control means 88 which controls each of means 81–84 repetitively, in accordance with previously set or decided points and directions of lines at such points as well as a new point decided by the decision means 85 and the direction of a new line at this point, to provide a large number of points between the first and second points 11 and 12. This control means 88 can be operated by the same principle as explained in connection with FIG. 11.

Figure 25:
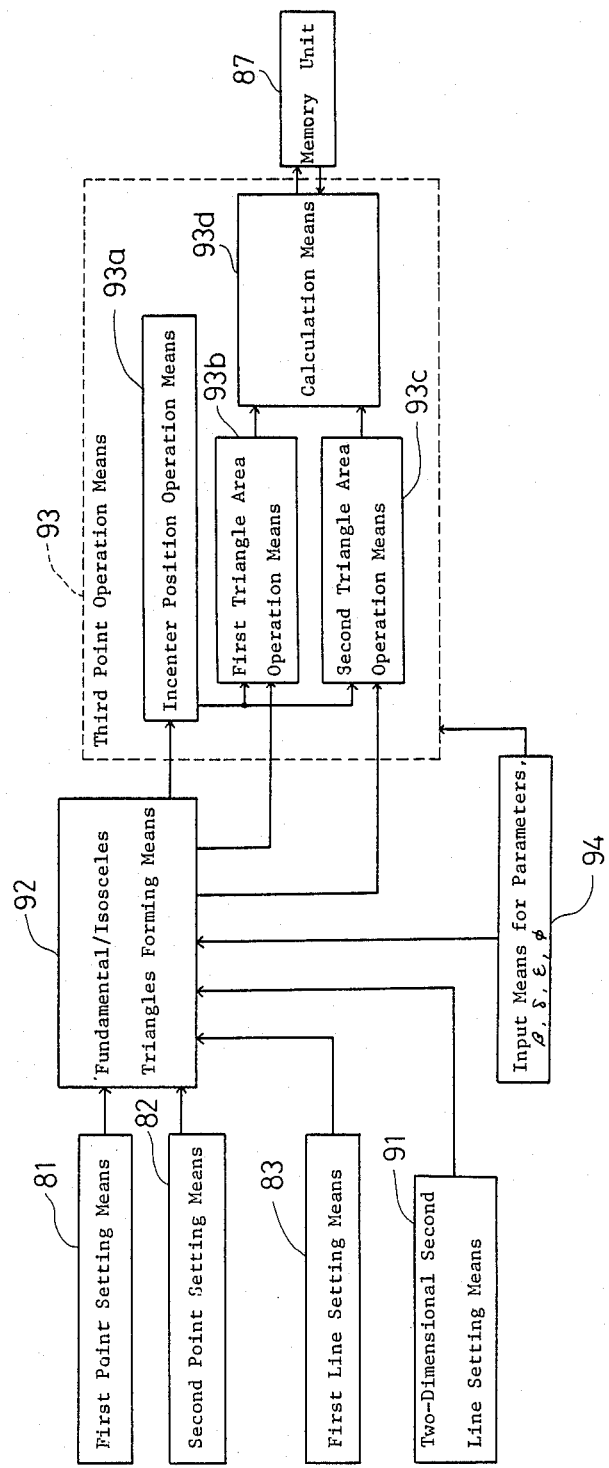
FIG. 25 is a block diagram of still another embodiment of the present invention.

FIG. 25 illustrates a block diagram a still another embodiment of the invention, especially used to generate/create a two-dimensional boundary shape. In this embodiment, there are provided a first point setting means 81 to set up a first point 11 at an arbitrary position, its principle being illustrated in FIG. 2, and a second point setting means 82 to set up a second point 12 at a different arbitrary position from that of the first point 11. This embodiment also includes a first straight line setting means 83 to establish a first straight line L1 passing through the point 11 in an arbitrary direction and a two-dimensional second straight line setting means 91 to establish a second straight line L2 passing through the point 12 in an arbitrary direction within a plane formed by point 11 and line L1.

Also, as its principles are shown in FIGS. 2 to 4, there is provided an isosceles triangle forming means 92. In this forming means 92, a fundamental triangle is first generated/created by a chord L3 between points 11 and 12, the first line L1 and the second line L2, and then an isosceles triangle having two equal sides each of which is equal to the shorter one of the fundamental triangle sides other than the side generated/created by the chord L3.

Further, this embodiment includes a third point operation means 93 which, as its principle is illustrated in FIGS. 5 through 11 and 15, calculates the position of a third point as well as the direction of a third line containing this third point in accordance with the attributes of the above-mentioned fundamental and isosceles triangles.

This third point operation means 93 includes the following components: that is, an internal center position operation means 93a (which applies the principles in FIGS. 5 and 6) to calculate the positions of the incenters of the fundamental and isosceles triangles; first triangle area operation means 93b (which applies the principles in FIG. 7) to calculate the area of the first triangle enclosed by the line connecting the incenter of the fundamental triangle and one of vertexes other than a vertex of a given angle commonly shared by the fundamental and isosceles triangles, a perpendicular bisector of a line connecting the isosceles triangle incenter and a vertex of the fundamental triangle positioned opposite to the one vertex within the isosceles triangle, and a side positioned opposite to the one vertex; a second triangle area operation means 93c (which also applies the principle in FIG. 7) to calculate the area of a second triangle enclosed by a line connecting the fundamental triangle incenter with the other vertex other than the given angle vertex, a perpendicular bisector of a line connecting the isosceles triangle incenter with a vertex which is opposite to the other vertex within the isosceles triangle, and a side opposite to the other vertex; and, a calculation means 93d (which applies the principles in FIGS. 8 to 10) to calculate, as the position of a third point, the position on a bisector of the given angle that is spaced apart from the position of the fundamental triangle incenter by a distance which depends on the difference between the areas of the first and second triangles as well as the distance between the first and second points.

The third point operation means 93 further includes means for inputting the parameters $\beta$, $\delta$, $\epsilon$, $\phi$, and a memory unit 87 to store information on each of the points decided by the third point operation means 93 itself. The operation circuit 3 is capable of performing the functions of the the above-mentioned fundamental and isosceles triangles forming means 92 as well as those of the third point operation means 93.

Figure 26:
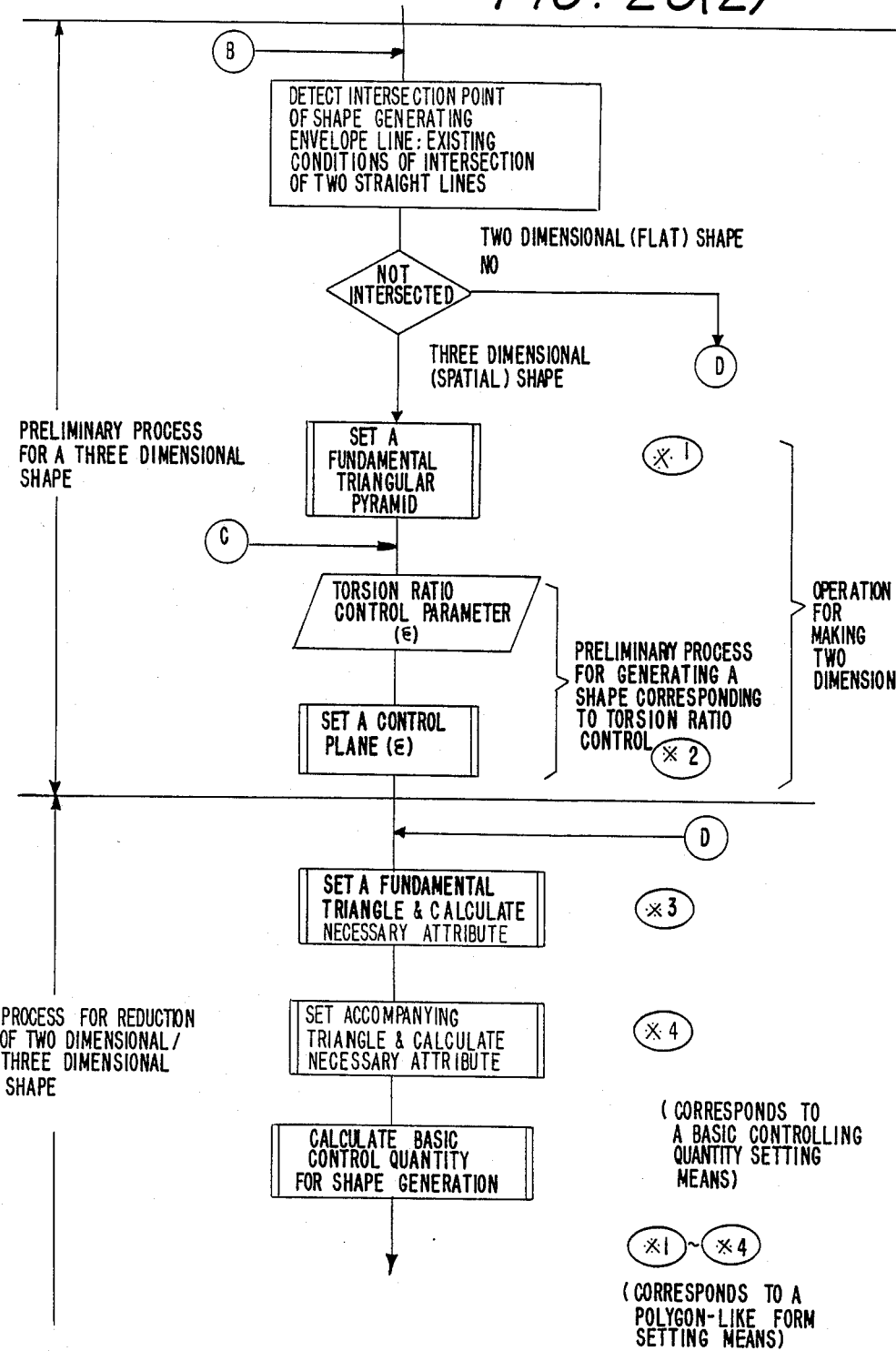
FIGS. 26(1), 26(2), 26(3), 26(4) and 26(5) illustrate a flow chart showing one of the embodiments of the present invention.
Figure 26:
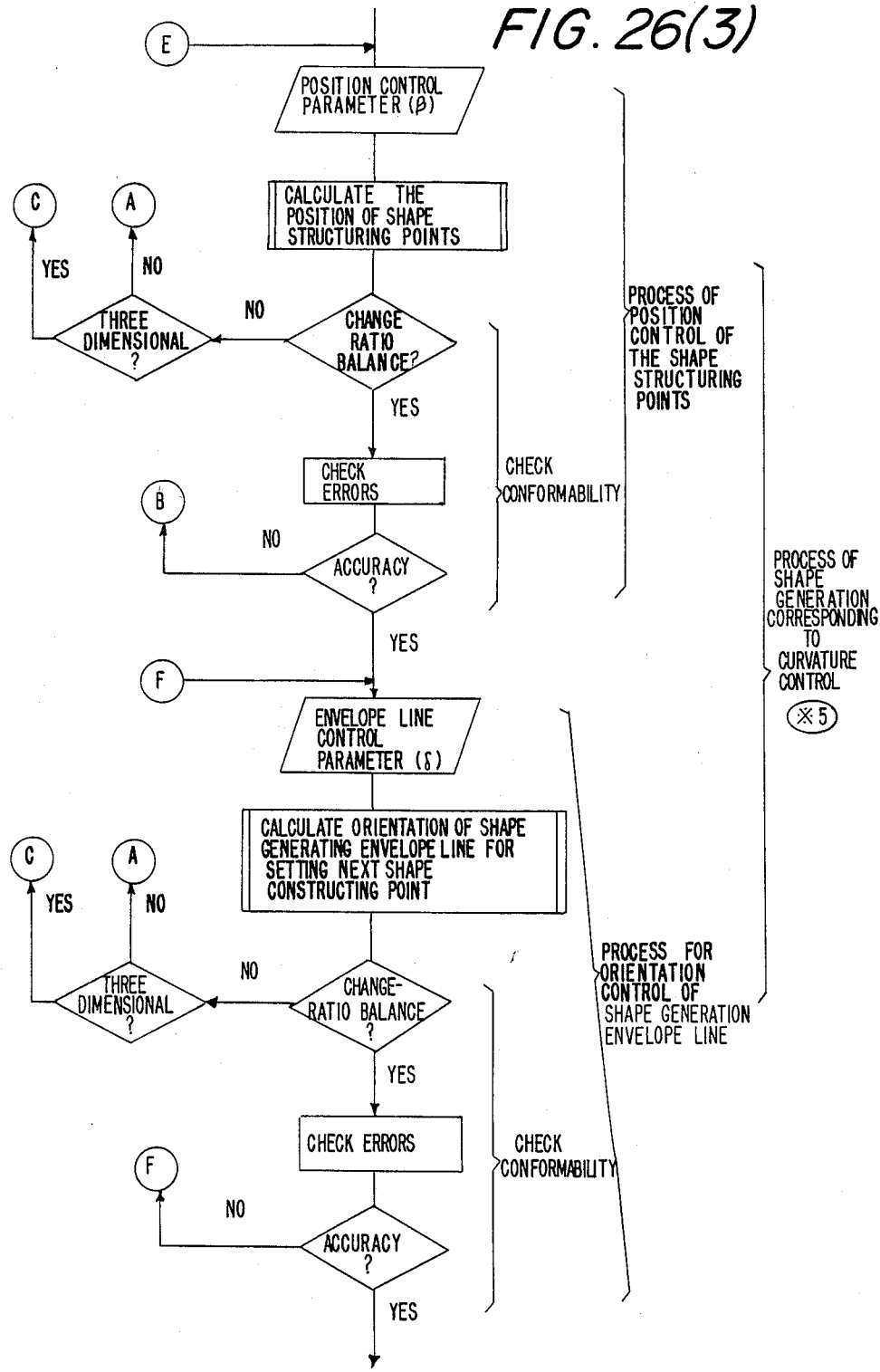
Figure 26:
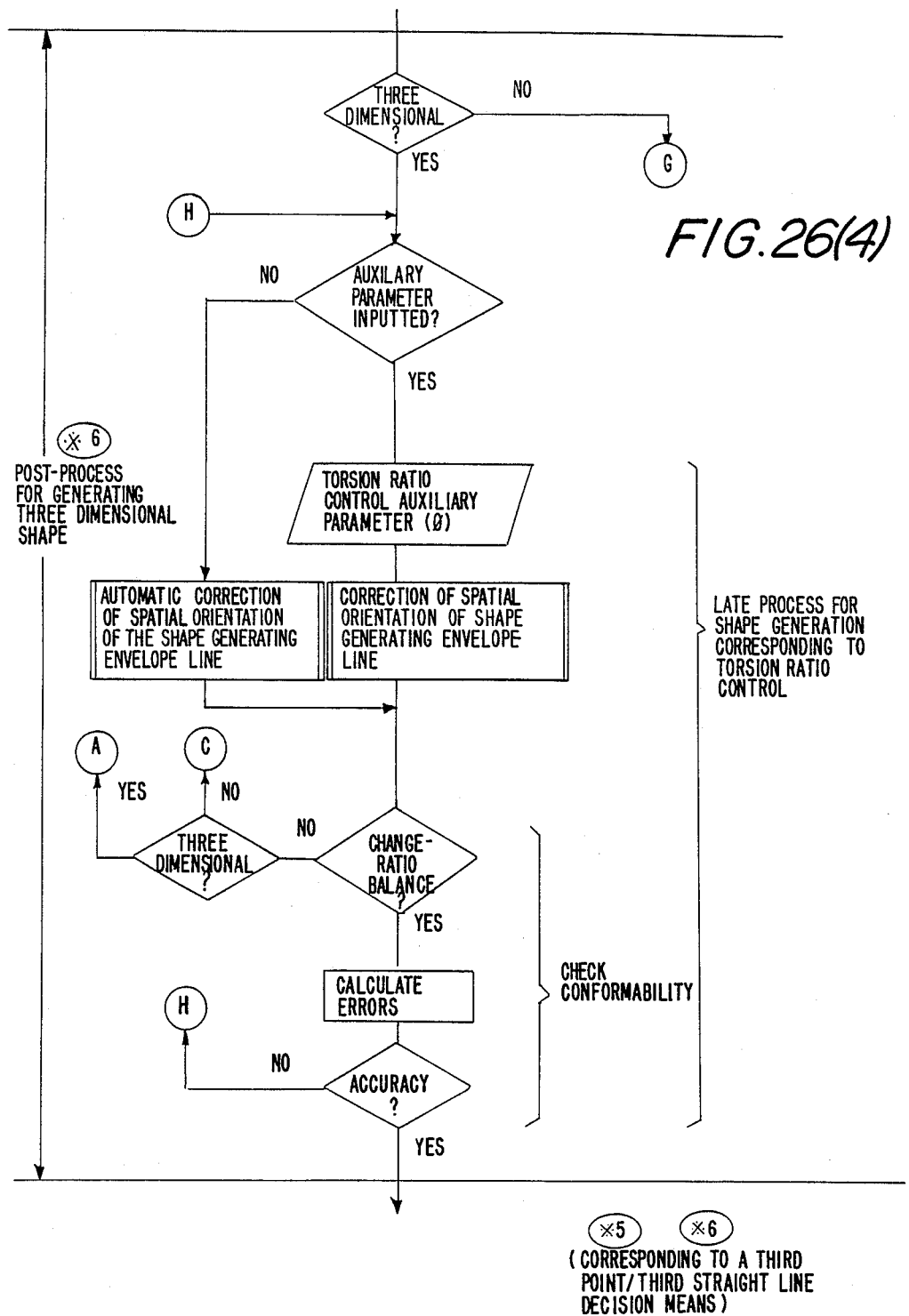
Figure 26:
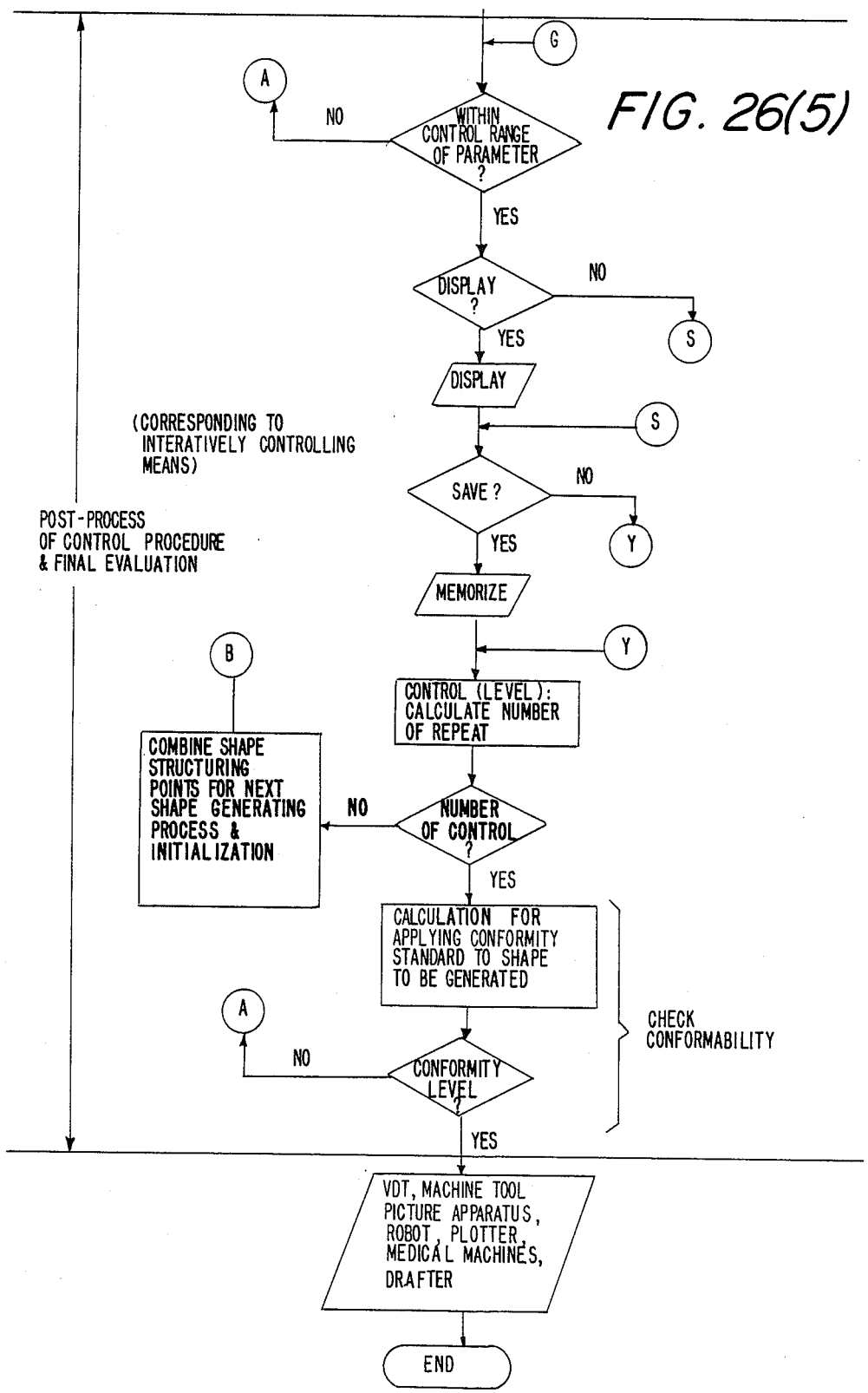
Figure 35:
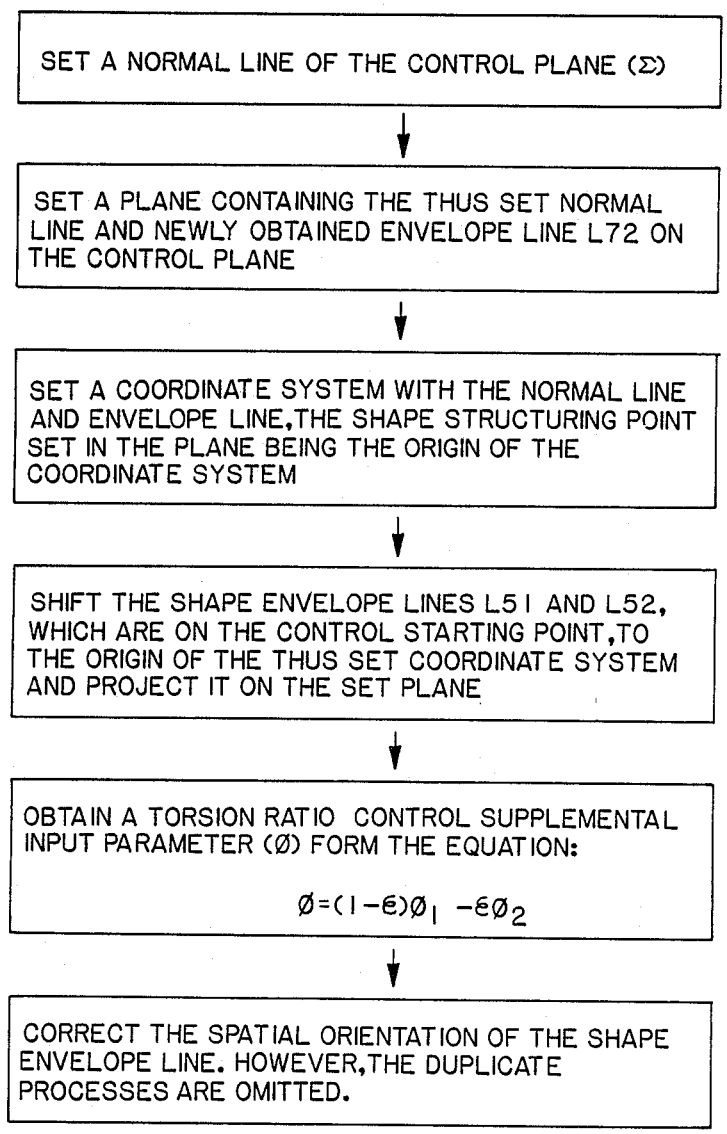

FIG. 26 shows one embodiment of the present invention in a form of a flow chart. In this embodiment, in accordance with the same frame of flow chart, a boundary shape of the required/presented solid can be generated/created self-systematically for both a three dimensional boundary shape which substantially contains torsion and a two dimensional boundary shape with no distortions.

The boundary shape evaluation standard in this flow chart is an example of the measured numerical expressions of the boundary shape of the required/presented solid. In this case, the evaluation standard is used in a separated manner: the degree of agreement and degree of conformity. The evaluation standard is, in accordance with the content defined, used as the standard of comparison/judgment at each control level in order to perform a branching control and jumping control in the flow chart. Here also, as an initial condition, an input is made through keyboards, etc. of the computer terminal as in the case of ordinary input processing.

The designation of the range, wherein the boundary shape controlling parameters ($\beta$, $\delta$, $\epsilon$, $\phi$), which are the restraining conditions of the controlling parameter for the generation of the boundary shape, can be controlled is one of the boundary shape evaluation standard quantities which is inductively determined by the experimental analysis, etc. Precisely, it is a control standard for the generation/creation of the boundary shape which is an equivalent to the boundary shape evaluation standard.

The number of the control operation designated as a control level of generating/creating the boundary shape is the number of repeat of a step-by-step process of the generation/creation of the boundary shape, and it takes the role of a compulsory stop of the generation/creation of the boundary shape.

On the other hand, as an initial condition for the generation/creation of the boundary shape, to set the position of the starting point of the boundary shape control and the direction of the boundary shape envelope line on the starting point is essential in the present invention. This procedure is called the initial condition for generating/creating the boundary shape, and an input process is defined therein.

The procedure to "set the basic position of the boundary shape to be generated" in the above (initial condition for generating/creating the boundary shape) is an operation to set the position of the starting point of the boundary shape set the position of the starting point of the boundary shape generating control. In other words, it is an operation to set a spatial arrangement. This operation corresponds to "a point setting means". In here, the position of the starting point of the control is inputted and determined, as positional vector or coordinates, through image scanners, digitizers, pointing mouse, joy sticks or keyboards, etc.

Also, the procedure to "set the basic orientation of the boundary shape to be generated" is the operation in the flow to determine the direction of the shape generating envelope line or spatial direction which can be determined as the step which follows the input process of the basic position of the control starting point. This procedures correspond to "a straight line setting means". Here also, the direction of the boundary shape envelop line is, since it is a straight line, inputted and determined by the same input method as in the position setting as vectorial cosine or directional angle of a straight line.

The process next to the initial condition input process is to judge whether or not an intersection point formed by the given two straight lines exists. "Intersection point exists" means that two straight lines are in the same plane and the boundary shape to be generated/created is a 2.5 dimensional boundary shape or a flat shape. "No intersecting point exists" means that the two straight lines are not in the same plane, and the boundary shape to be generated/created is definitely a three dimensional shape having a torsion such as a solid body having free curved surfaces. In this case, because of the torsion a preliminary process which is peculiar to a three dimensional shape is required as shown in the flow chart. The preliminary process for generating/creating a three dimensional shape contains two procedures. One is to form a fundamental triangular pyramid. The other is to set a control plane ($\Sigma$) which corresponds to a torsion control. Since a flat shape which does not contain any torsion needs no such a process as just mentioned above, the next process which is to "form a fundamental triangle and calculate a required attribute" can be conducted immediately for two dimensional shapes.

In addition to the process to "set a fundamental triangular pyramid" and "set a control plane ($\Sigma$)" which are preliminary processing routines peculiar to a three dimensional shape forming, the processes to "form a fundamental triangle and to calculate the required attribute" and to "form an accompanying triangle and calculate the required attribute" which are the routine process common to both the two dimensional shape and three dimensional shape forming are provided. These are the processes correspond to "a polygon-like form setting means". In the embodiment, for the purpose of an easy structuring of the system, the flow is shown in a more detail manner.

After conducting a series of procedure as mentioned above, a setting of the basic control quantity which is inevitable for generating/creating a boundary shape is conducted. In the flow chart, as a basic procedure, the setting is defined as an independent function and works as one of the essential procedure in the flow chart. The procedure for "setting the basic control quantity for generating a boundary shape" corresponds to "a basic controlling quantity setting means".

The procedure to "set a basic control quantity for generating a boundary shape" is followed by the process to input "a position control parameter ($\beta$)" and then by the next step to "set positions of boundary shape forming points" and further advances to the post-process for generating a three dimensional boundary shape. The above procedures are referred to as "a third point/third straight line decision means" in the claims.

The above process is very important in the entire flow. Each process, that is, to "set positions of boundary shape forming points" and the following process to "calculate the directions of boundary shape generating envelope line for setting the next boundary shape forming points" which are defined in the claims as "a third point/third straight line decision means", can be defined as a separated and independent function to each other which respectively corresponds to "a third point decision means means" and "a third straight line decision means".

In case of a three dimensional shape, a correction of the spatial orientation of the boundary shape generating envelop line must be carried out. This correction is, of course, can be controlled from outside by using an input means. It can also be controlled internally since the correction can be calculated automatically as shown in the flow chart. Based upon this function, in the flow chart of the embodiment, the correction is made internally or self systematically.

At the final stage of the flow chart, a post-process of the control procedure and the final evaluation are carried out. These procedures correspond to "an interatively controlling means". The main procedure therein is to "combine the boundary shape forming points for the next boundary shape generating/creating process and to initialize the process." This procedure corresponds to "an interatively controlling means".

Accordingly, the present invention is capable of generating/creating a boundary shape or modifying a generated/created form with ease. Thus, the invention can be effectively applied to a shape working machine, a form recognition device, an image processor, an autodrawing instrument, an image creator and the like in NC machine tools or the like. When applied to these machines and devices, the invention can perform not only two-dimensional operations but also three-dimensional operations.

While the above described operations can be performed by specific hardware, they can also be performed by a general purpose computer working together with software written in accordance with the above-described flow charts to implement each of the desired functions or means.

As has been described hereinbefore, the present invention provides a shape generating/creating system which provides for a free access to a boundary shape to be generated/created through-out the whole process ranging from its design step to its manufacturing step.

I claim:

1. A shape generating system for computer aided design, computer aided manufacturing, computer aided engineering and computer applied technology comprising:

a first and second point setting means for setting each position of both a first point and a second point at an arbitrary but different position in a formative space with the help of position pointing devices, and said position pointing operation is performed for determining said points, which satisfy a constructive point of a boundary shape of a forming solid or figure and determine the span of the boundary shape of said solid or figure, to be used as a starting point;

a first and second straight line setting means for setting each line passing separately through said first point and said second point in an arbitrary direction of said space, but not parallel to each other, with the help of direction pointing devices, and a direction indicating operation is performed for determining said straight lines, which are enveloped over the boundary shape of said solid or figure, and determine the constructing region of a solid or figure, to be used as a starting line;

a polygon-like form setting means for setting a polygon-like form of a wire frame-like form, which is formed by the constructive procedure and set-up relations in accordance with both the position of said second point and the direction of said second line as well as the position of said first point and the direction of said first line, by means of calculating devices;

a basic controlling quantity setting means for setting characteristic quantity, which is calculated from said polygon-like form set by said polygon-like form setting means and required for generating the boundary shape of said solid or figure, by means of said calculating devices;

a third point/third straight line decision means for determining the position of the third point, which satisfies the boundary shape of said solid, and the direction of the third straight line passing through said third point, which is enveloped over the boundary shape of said solid or figure, in accordance with the characteristic quantity from said basic controlling quantity setting means, means of calculating devices with an input means for setting and shape control parameters, said third point/third straight line decision means comprising:

an input means for inputting said shape control parameters; and said calculating devices, said calculating devices for determining said third point and said direction of said third line in response to said shape control parameters and said characteristic quantity; and an iteratively controlling means for controlling repetitively each of said polygon-like form setting, basic control quantity setting and third point/third straight line decision means and for inserting the determined position and direction of the straight line relevant to said third point in each set of the previously set position and direction of the straight line relevant to said first point and second point fixed by said first and second point setting ments, and further for adding each set of the position and direction of straight lines through the points, which are newly determined by repetitively controlling each of said means, to each previously determined set of the position and direction of straight lines through the points until a range of accuracy or limitation in performance for such solid or figure for generating the boundary shape of said solid or figure between said first point and said second point is achieved.

2. A shape generating system according to claim 1, wherein:

said polygon-like form setting means further comprises:

a fundamental triangle constructing means for determining a fundamental triangle enclosed by a straight line between said first point and said second point, which is a third edge, said first straight line or alternative line projected on a control plane of said polygon-like form for said first line, which is a first edge, and said second straight line or alternative line projected on said plane, which is a second edge; and an isosceles triangle constructing means for determining an isosceles triangle having equilateral edges equal to a length of a shorter side edge of said fundamental triangle between said first edge and said second edge, which is made by putting the vertex of the longer side edge of said fundamental triangle between said first edge and said second edge and taking said shorter side edge as a common edge included between said fundamental triangle and said isosceles triangle; and said third point/third straight line decision means further comprises a third point setting operation means for calculating the position of said third point and a third straight line setting operation means for calculating a direction of a straight line passing through said third point in accordance with said basic controlling quantity reduced as the difference between said fundamental triangle and said isosceles triangle.

3. A shape generating system according to claim 2, wherein said basic controlling quantity setting means further comprises:

an internal center position operating means for calculating both a position of an internal center of said fundamental triangle and a position of the internal center of said isosceles triangle;

a first triangle area operating means for calculating an area of a first triangle enclosed by a set of three lines, one of said three lines is the shorter side edge of said fundamental triangle, another line is a line crossing between said internal center of said fundamental triangle and the longer side vertex but not the intersection of said first straight line and said second straight line, and a last line is perpendicular to the line segment between said internal center of said isosceles triangle and the shorter side vertex but not said intersection and passes through a point dividing a length of said line segment into two halves; and a second triangle area operating means for calculating the area of a second triangle which is constructed at the opposite side of said first triangle according to the opposite operation corresponding to the disposing relation used by said first triangle.

4. A shape generating system according to claim 2 or 3, wherein said third point/third straight line decision means further comprising:

a calculation means for calculating and controlling both the position of said third point and the direction of said straight line at said third point which sets both the position of said third point as a distance from the internal center of said fundamental triangle and the direction of said third straight line as an angle apart from a mean angle equal to a direction of the bisector between a line passing through both said first point and said third point and a line passing through both said second point and said third point corresponding to the difference between the areas of said first and second triangle according to the shape control parameters, which are respectively defined as control variables for the main control process on generating the boundary shape of said solid.

5. A shape generating/creating system according to claim 4, wherein said calculation means also calculates and controls the position of said third point and the direction of the straight line passing through said third point by means of such input devices as an image scanner, digitizer, pointing mouse, joy-stick and keyboard, calculating devices, controlling devices with buffering memory and such output devices as a video display terminal, image drafting machine, image plotter, shape forming machine, robot, pattern discriminator, eye-visual machine or image-visual simulator.

* * * * *